(12) United States Patent
Kuckuck et al.

(10) Patent No.: US 11,877,541 B2
(45) Date of Patent: **\*Jan. 23, 2024**

(54) DEBRIS REMOVAL APPARATUS, SYSTEMS, AND METHODS OF USING THE SAME

(71) Applicants: Randy Leon Kuckuck, Dundee, MI (US); Kevin Lee Newcomer, Monroe, MI (US)

(72) Inventors: Randy Leon Kuckuck, Dundee, MI (US); Kevin Lee Newcomer, Monroe, MI (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/220,351

(22) Filed: Apr. 1, 2021

(65) Prior Publication Data

US 2021/0219504 A1    Jul. 22, 2021

Related U.S. Application Data

(63) Continuation of application No. 16/398,311, filed on Apr. 30, 2019, now Pat. No. 10,966,378.

(Continued)

(51) Int. Cl.
*A01G 20/47*    (2018.01)
*A47L 5/14*    (2006.01)
(Continued)

(52) U.S. Cl.
CPC ............... *A01G 20/47* (2018.02); *A47L 5/14* (2013.01); *A47L 5/22* (2013.01); *A63B 57/50* (2015.10);
(Continued)

(58) Field of Classification Search
CPC ... A01G 20/47; A47L 5/14; A47L 5/22; A47L 5/24; A47L 9/22; A63B 57/50;
(Continued)

(56) References Cited

U.S. PATENT DOCUMENTS 954,260 A    4/1910  Davis
1,108,053 A    8/1914  Wiwi et al.
(Continued)

FOREIGN PATENT DOCUMENTS

WO    WO2018028639    2/2018

*Primary Examiner* — David Redding
(74) *Attorney, Agent, or Firm* — MacMillan, Sobanski & Todd, LLC

(57) ABSTRACT

Debris removal apparatus, systems, and methods of using the same are described. An example debris removal apparatus includes a shaft, an energy source, a motor, a fan attached to the motor, and a switch. The shaft has a lengthwise axis, a first end, a second end, a first portion, a second portion, a third portion and defines an opening on the second end, a passageway in fluid communication with the opening, and a plurality of inlet openings on the third portion of the shaft in fluid communication with the passageway. The motor is operatively connected to the energy source and disposed between the plurality of inlet openings and the second end of the shaft. The motor has a lengthwise axis extending through a drive shaft. The lengthwise axis of the motor is parallel to the lengthwise axis of the shaft. The switch is operatively connected to the motor.

14 Claims, 18 Drawing Sheets

Related U.S. Application Data

(60) Provisional application No. 62/665,051, filed on May 1, 2018.

(51) Int. Cl.
*A63B 57/50* (2015.01)
*A47L 5/22* (2006.01)
*F04D 25/06* (2006.01)
*F04D 19/00* (2006.01)

(52) U.S. Cl.
CPC ........ *F04D 19/002* (2013.01); *F04D 25/0673* (2013.01)

(58) Field of Classification Search
CPC ............ A63B 2210/58; A63B 2225/09; A63B 2225/093; F04D 19/002; F04D 25/0673; F04D 25/084
See application file for complete search history.

(56) References Cited

U.S. PATENT DOCUMENTS

| | | | |
|---|---|---|---|
| 1,504,003 A | 8/1924 | Trumbull | |
| 1,747,258 A | 2/1930 | O'Neil | |
| 2,595,406 A | 9/1948 | Popovich | |
| 3,099,386 A | 7/1963 | Pieper | |
| 3,999,243 A | 12/1976 | La Pour | |
| 4,082,276 A | 4/1978 | Szafianski | |
| 4,132,507 A | 1/1979 | Akiyama et al. | |
| 4,237,576 A | 12/1980 | Stakes | |
| 4,288,886 A | 9/1981 | Siegler | |
| 4,628,674 A | 12/1986 | Dougan | |
| 4,734,017 A | 3/1988 | Levin | |
| 4,884,314 A | 12/1989 | Miner et al. | |
| 4,945,604 A | 8/1990 | Miner et al. | |
| 5,257,913 A | 11/1993 | Schwarzer et al. | |
| 5,332,222 A | 7/1994 | Perry | |
| 6,039,062 A | 3/2000 | Karakaedos | |
| 6,092,260 A | 7/2000 | Kai | |
| 6,105,206 A | 8/2000 | Tokumaru et al. | |
| 6,393,646 B1 | 5/2002 | Beers, Jr. et al. | |
| 6,422,835 B1 | 7/2002 | Beauchard | |
| 6,494,514 B1 | 12/2002 | Stinnett et al. | |
| 7,510,225 B1 | 3/2009 | Stinnett et al. | |
| 7,845,048 B1 | 12/2010 | Bailey et al. | |
| 7,941,894 B1 | 5/2011 | Skorput | |
| 8,316,506 B1 | 11/2012 | Spalj | |
| 8,992,176 B2 | 3/2015 | Haseman et al. | |
| D733,686 S | 7/2015 | Harris | |
| 10,966,378 B2 * | 4/2021 | Kuckuck | F04D 25/084 |
| 2004/0140771 A1 | 7/2004 | Kim et al. | |
| 2004/0154125 A1 | 8/2004 | Houvener | |
| 2005/0210624 A1 | 9/2005 | Lammers et al. | |
| 2009/0038108 A1 | 2/2009 | Shaanan et al. | |
| 2012/0107097 A1 | 5/2012 | Haseman et al. | |
| 2012/0201668 A1 | 8/2012 | Peterson et al. | |
| 2013/0052045 A1 | 2/2013 | Harris | |
| 2013/0177859 A1 | 7/2013 | Prior et al. | |
| 2016/0298635 A1 | 10/2016 | Su et al. | |
| 2017/0020079 A1 | 1/2017 | Rhodes | |
| 2018/0087513 A1 | 3/2018 | Hoffman | |

* cited by examiner

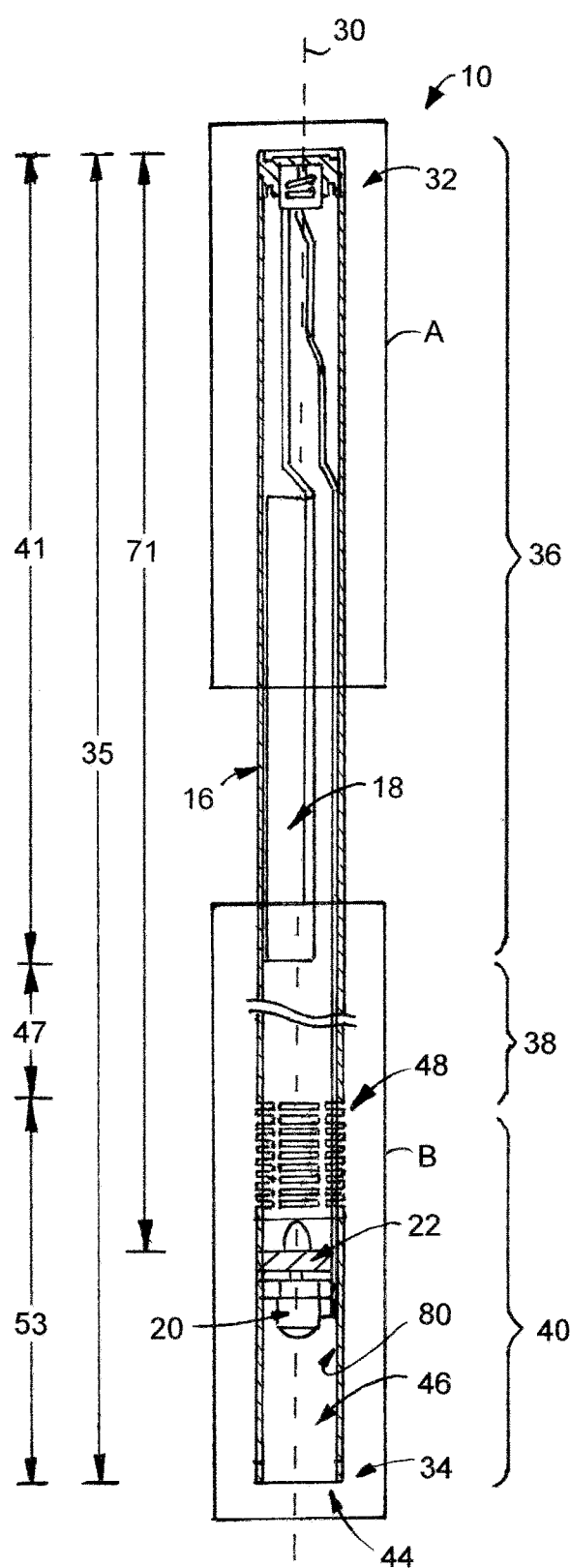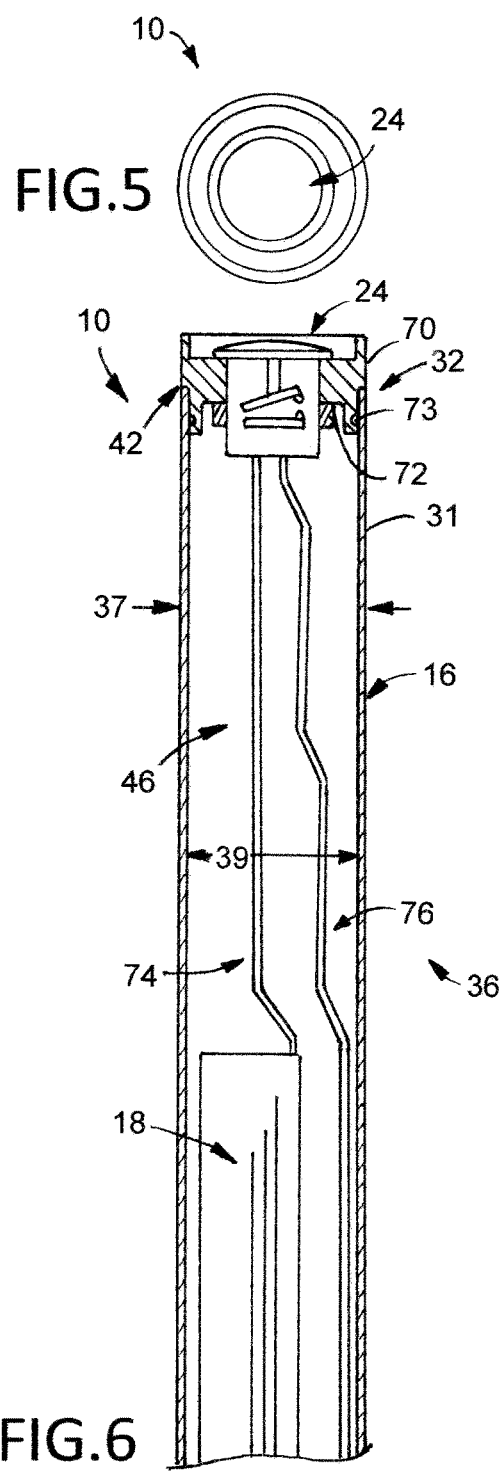

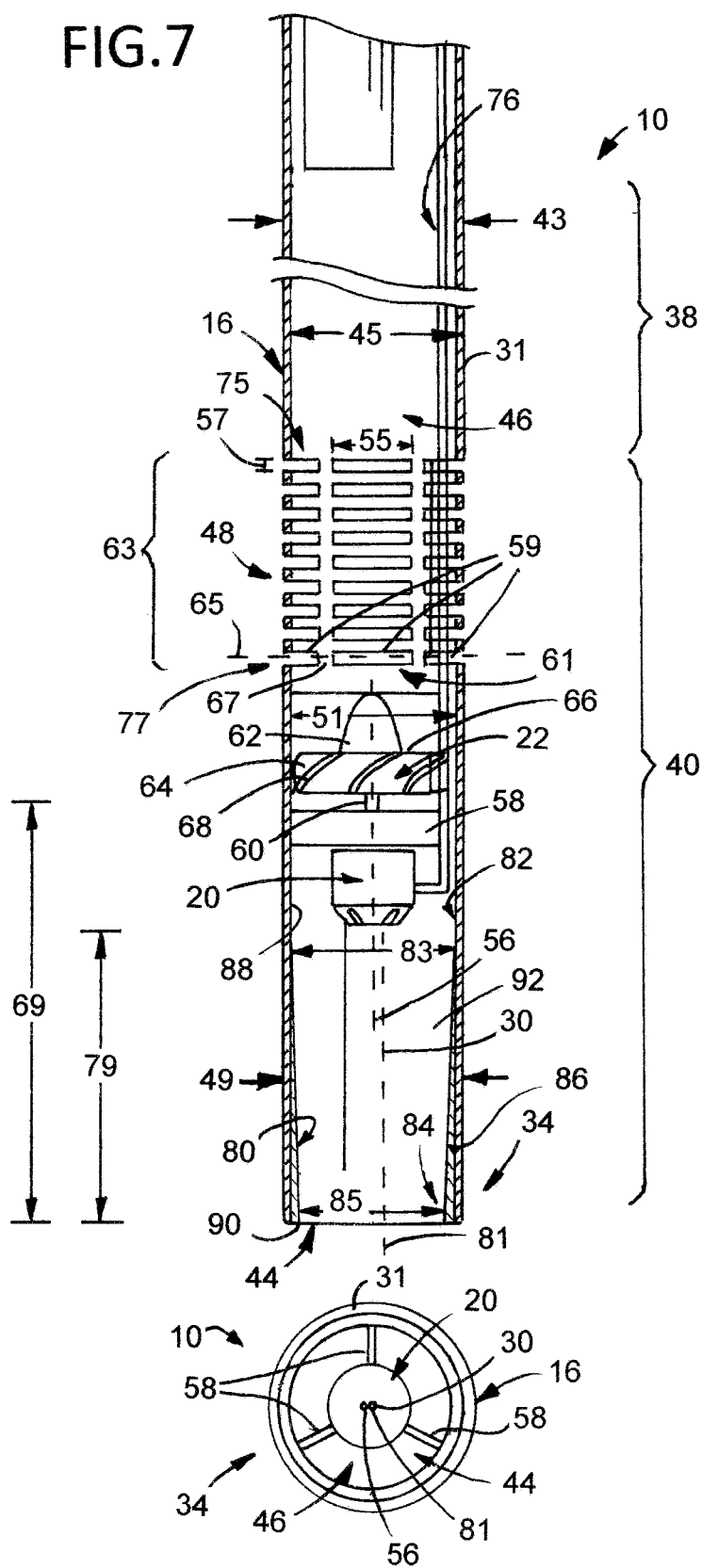

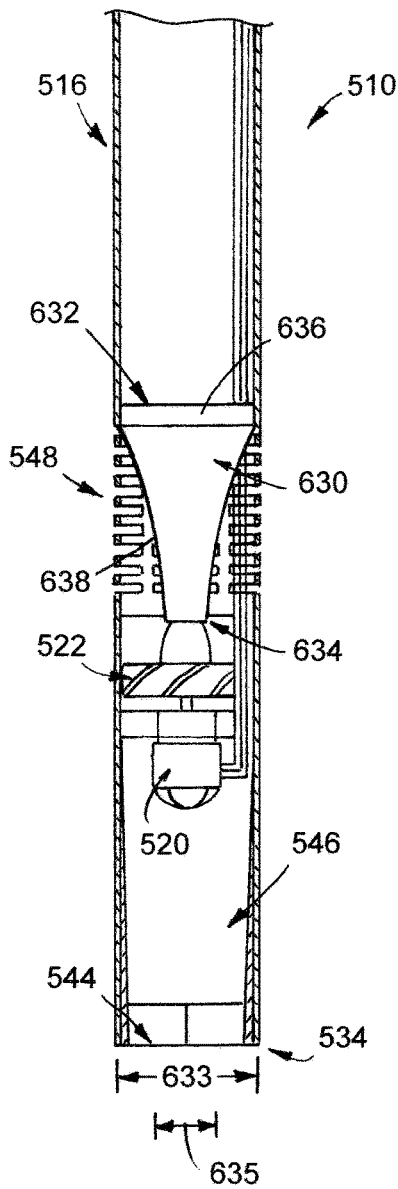
FIG.11
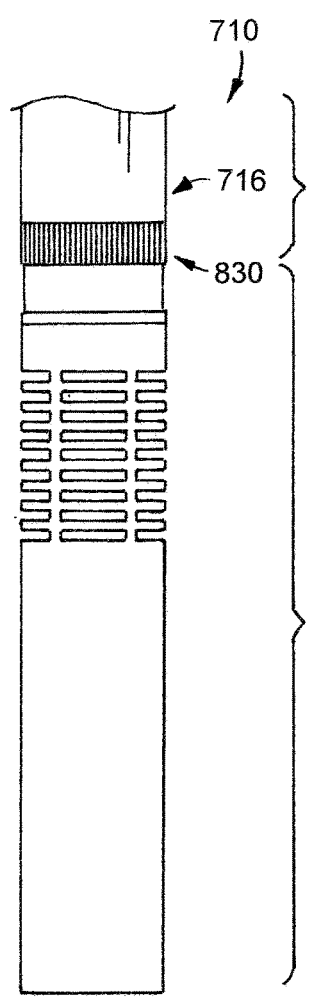
FIG.12
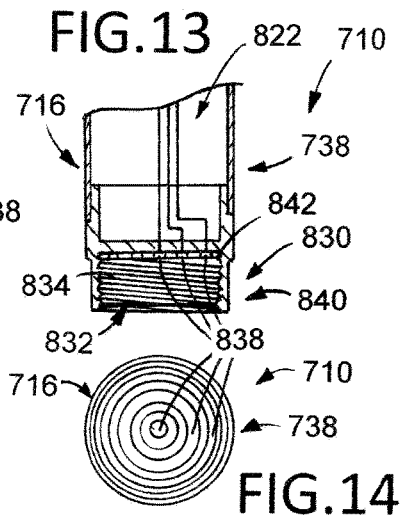
FIG.13
FIG.14
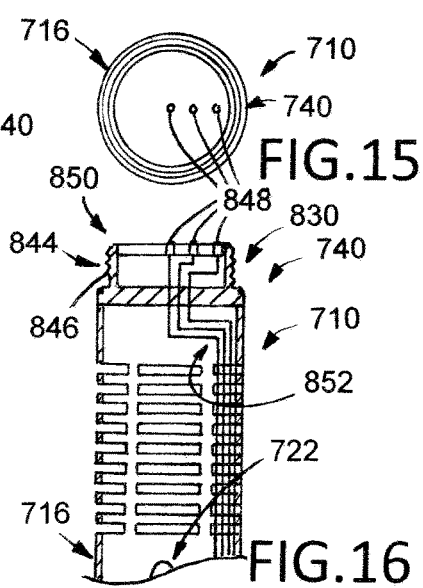
FIG.15
FIG.16

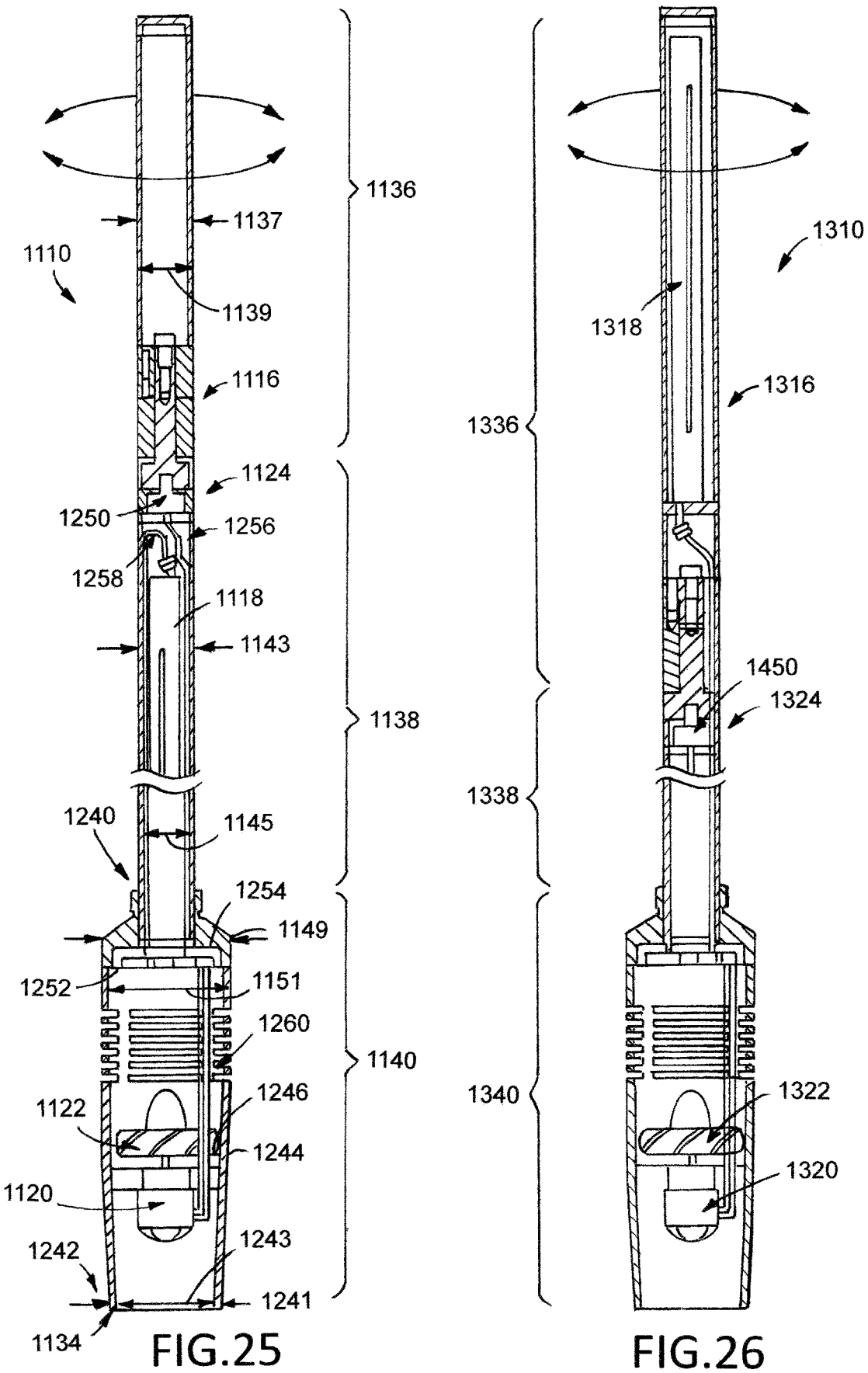

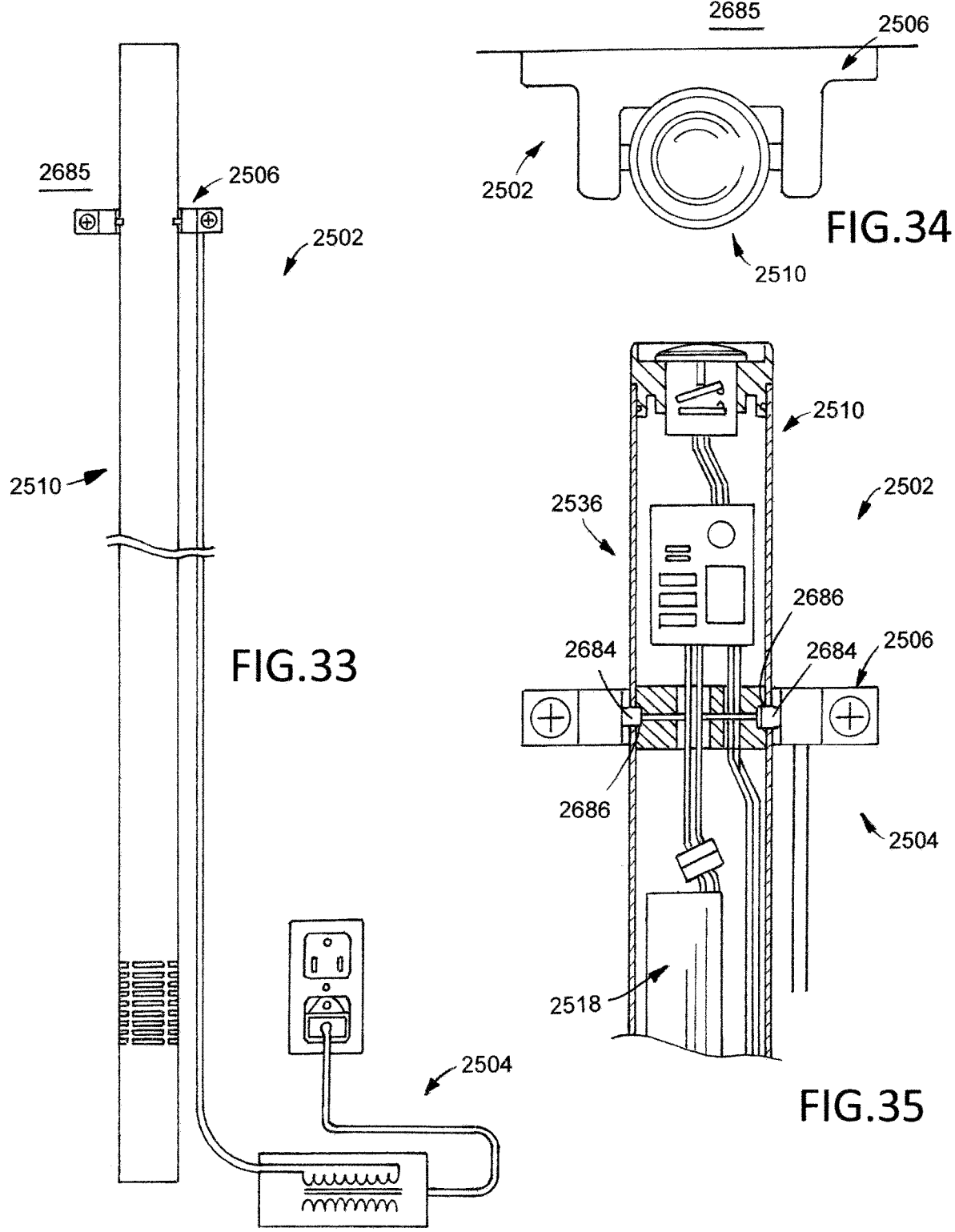

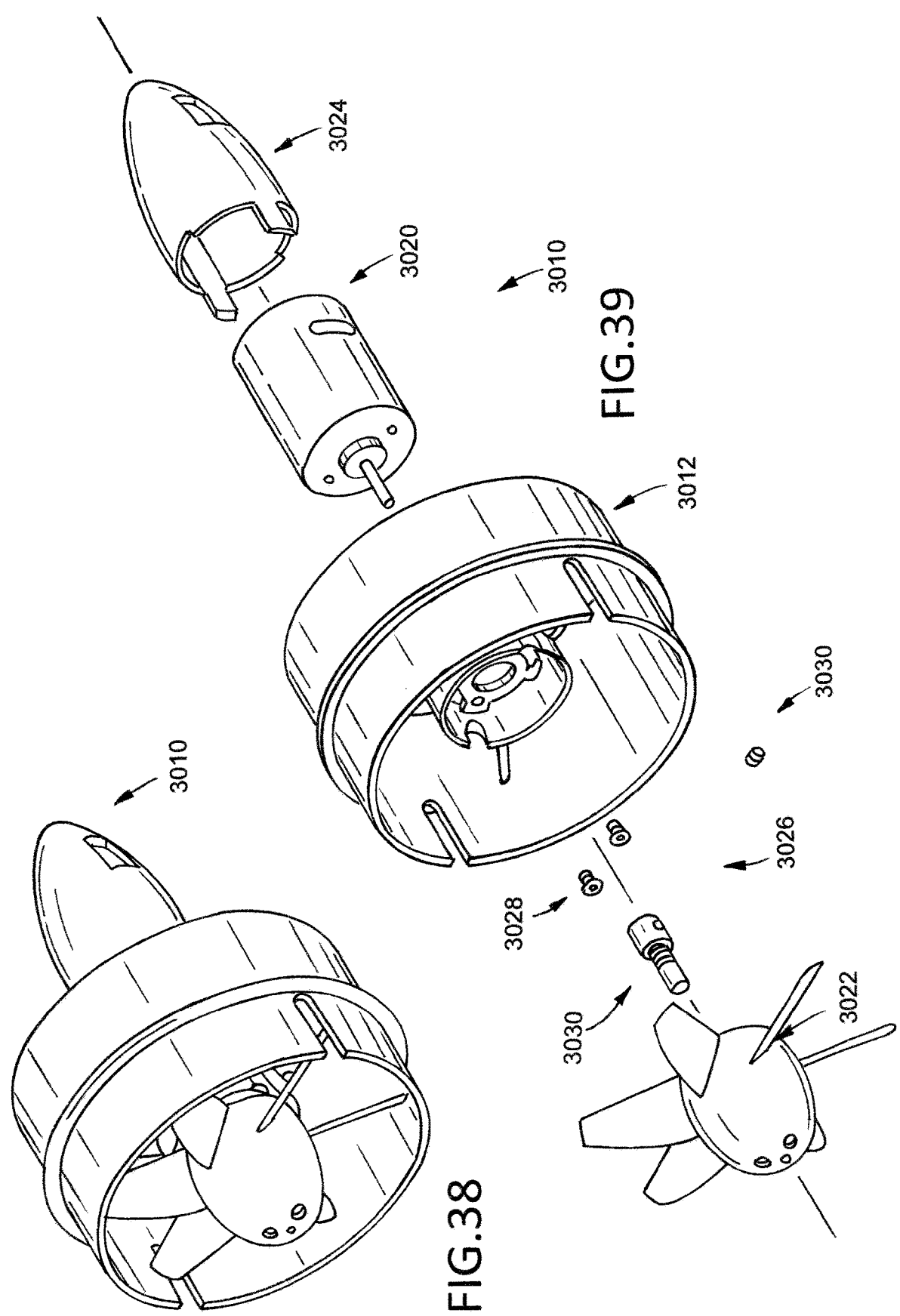

DEBRIS REMOVAL APPARATUS, SYSTEMS, AND METHODS OF USING THE SAME

RELATED APPLICATION

This application is a continuation of U.S. patent application Ser. No. 16/398,311, filed Apr. 30, 2019, which claims the benefit of U.S. Provisional Application No. 62/665,051, filed on May 1, 2018. Each of these related applications is hereby incorporated by reference into this disclosure in its entirety.

FIELD

The disclosure relates generally to the field of debris removal. More particularly, the disclosure relates to a debris removal apparatus, systems, and methods of using the same.

BACKGROUND

Debris removal apparatus, such as leaf blowers, are common tools used by homeowners and lawn care companies to move a variety of debris across grass and other surfaces. Current debris removal apparatus, however, have several significant drawbacks. For example, they are bulky, heavy, noisy, and most require use of a gas engine. Furthermore, some apparatus position the motor in a handle, or adjacent the user, such that the motor is located at an end opposite to where air flows out of the apparatus, which significantly reduces the efficiency of the motor and reduces airflow. Various developments have been made in an effort to address the drawbacks of current apparatus. However, these developments have failed to produce an apparatus that is convenient to use in quick application settings (e.g., cleaning stairs, removing light snow from automobile, removing sand and tree debris from golf putting surfaces, starting small fires) and that doesn't require a user to bend over to direct airflow on the surface intended to be cleaned.

Therefore, a need exists for new and useful debris removal apparatus, systems, and of methods of using the same.

SUMMARY OF SELECTED EXAMPLE EMBODIMENTS

Various debris removal apparatus, systems, and methods of using the same are described herein.

An example debris removal apparatus has a shaft, an energy source, a motor, a fan, and a switch. The shaft has a lengthwise axis, a first end, a second end, a first portion, a second portion, a third portion and defines an opening on the second end, a passageway in fluid communication with the opening, and a plurality of inlet openings in fluid communication with the passageway. The first portion extends from first end toward the second end. The second portion is disposed between the first portion and the third portion. The third portion extends from the second end toward the first end to the second portion. The passageway extends from the opening on the second end and toward the first end. Each opening of the plurality of inlet openings is positioned on the third portion of the shaft. The energy source is disposed on the first portion of the shaft. The motor is operatively connected to the energy source and is disposed between the plurality of inlet openings and the second end of the shaft. The motor has a lengthwise axis, a drive shaft, and off and on states. The lengthwise axis of the motor extends through the drive shaft and is parallel to the lengthwise axis of the shaft. The fan is attached to the motor. The fan has a hub and a plurality of blades. The switch is operatively connected to the motor and is moveable between first and second positions. Movement of the switch between the first and second positions moves the motor between its off and on states.

An example debris removal system has a battery charger and a debris removal apparatus. The battery charger has a first end and a second end. The first end of the battery charger is adapted to be plugged into an outlet. The second end is adapted to be received by a charging receptacle disposed on the debris removal apparatus.

An example method of using a debris removal apparatus to remove debris from a surface includes: obtaining a debris removal apparatus; directing a second end of a shaft of the debris removal apparatus toward a surface; activating the motor of the debris removal apparatus; manipulating the position of the debris removal apparatus relative to the surface such that debris is removed from the surface; and deactivating the motor of the debris removal apparatus.

Additional understanding of the example debris removal apparatus, systems, and methods can be obtained by review of the detailed description, below, and the appended drawings.

BRIEF DESCRIPTION OF THE DRAWINGS

FIG. 4 is a cross-sectional view of the debris removal apparatus illustrated in FIG. 1 taken along the lengthwise axis of the shaft.

FIG. 5 is a top view of the debris removal apparatus illustrated in FIG. 1.

FIG. 6 is a magnified view of Area A shown in FIG. 4.

FIG. 7 is a magnified view of Area B shown in FIG. 4.

FIG. 8 is a bottom view of the debris removal apparatus illustrated in FIG. 1.

FIG. 11 is a partial cross-sectional view of a fourth example debris removal apparatus taken along the lengthwise axis of the shaft.

FIG. 12 is a partial elevation view of a fifth example debris removal apparatus.

FIG. 13 is a partial cross-sectional view of the second portion of the debris removal apparatus illustrated in FIG. 12 taken along the lengthwise axis of the shaft.

FIG. 14 is a bottom view of the second portion of the debris removal apparatus illustrated in FIG. 12.

FIG. 15 is a top view of the third portion of the debris removal apparatus illustrated in FIG. 12.

FIG. 16 is a partial cross-sectional view of the third portion of the debris removal apparatus illustrated in FIG. 12 taken along the lengthwise axis of the shaft.

FIG. 25 is a partial cross-sectional view of the debris removal apparatus illustrated in FIG. 23 taken along the lengthwise axis of the shaft.

FIG. 26 is a partial cross-sectional view of an eighth example debris removal apparatus taken along the lengthwise axis of the shaft.

FIG. 33 is a partial view of a second example debris removal system.

FIG. 34 is a top view of the debris removal system illustrated in FIG. 33.

FIG. 35 is a partial cross-sectional view of the debris removal system illustrated in FIG. 33 taken along the lengthwise axis of the shaft of the debris removal apparatus.

FIG. 38 is a perspective view of an example electric ducted fan motor that can be included in a debris removal apparatus.

FIG. 39 is an exploded view of the electric ducted fan motor illustrated in FIG. 38.

DETAILED DESCRIPTION

Figure 1:
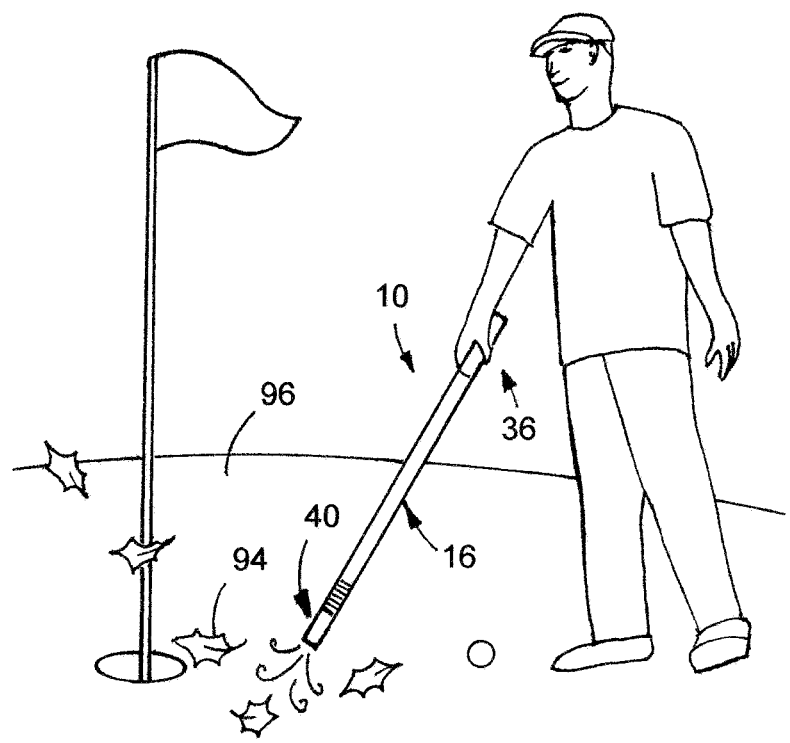
FIG. 1 is a perspective view of a user operating a first example debris removal apparatus.

The following detailed description and the appended drawings describe and illustrate various example embodiments of debris removal apparatus, systems, and methods. The description and illustration of these examples are provided to enable one skilled in the art to make and use a debris removal apparatus, a system, and to practice a method of using a debris removal apparatus. They are not intended to limit the scope of the claims in any manner.

FIGS. 1, 2, 3, 4, 5, 6, 7, and 8 illustrate a first example debris removal apparatus 10. The debris removal apparatus 10 comprises a shaft 16, an energy source 18, a motor 20, a fan 22, and a switch 24.

In the illustrated embodiment, the shaft 16 has a lengthwise axis 30, a main body 31, a first end 32, a second end 34, a length 35, a first portion 36, a second portion 38, and a third portion 40. The main body 31 defines a first opening 42, a second opening 44, a passageway 46 in fluid communication with the first opening 42 and second opening 44, and a plurality of inlet openings 48. The lengthwise axis 30 extends through the center of the passageway 46 at the first end 32 and the second end 34. The first portion 36 extends from first end 32 toward the second end 34 and can be utilized by a user as a handle during use. The second portion 38 is disposed between the first portion 36 and the third portion 40 and extends from the first portion 36 to the third portion 40. The third portion 40 extends from the second end 34 toward the first end 32 to the second portion 38. The first opening 42 is defined on the first end 32 and the second opening 44 is defined on the second end 34. The passageway 46 extends from the first opening 42 to the second opening 44 and through the entire length 35 of the shaft 16. Each opening of the plurality of inlet openings 48 is in fluid communication with the passageway 46 and is defined on the third portion 40 of the shaft 16.

The first portion 36 has a first outside diameter 37, a first inside diameter 39, and a first length 41. The second portion 38 has a second outside diameter 43, a second inside diameter 45, and a second length 47. The third portion 40 has a third outside diameter 49, a third inside diameter 51, and a third length 53. Each of the diameters 37, 39 of the first portion 36 is measured on a plane that extends through the first portion 36 and orthogonal to the lengthwise axis 30. Each of the diameters 43, 45 of the second portion 38 is measured on a plane that extends through the second portion 38 and orthogonal to the lengthwise axis 30. Each of the diameters 49, 51 of the third portion 40 is measured on a plane that extends through the third portion 40 and orthogonal to the lengthwise axis 30. The first outside diameter 37, the second outside diameter 43, and the third outside diameter 49 are equal to one another and the first inside diameter 39, the second inside diameter 45, and the third inside diameter 51 are equal to one another. Each of the lengths 41, 47, 53 is measured along the lengthwise axis 30 of the shaft 16. The first length 41 is greater than the second length 47 and the third length 53. The second length 47 is less than the first length 41 and the third length 53. The third length 53 is greater than the second length 47 and less than the first length 41.

While the lengthwise axis 30 has been illustrated as extending through the center of the passageway 46 at the first end 32 and the second end 34, a lengthwise axis can be positioned at any suitable location relative to a shaft. Selection of a suitable location to position a lengthwise axis relative to a shaft can be based on various considerations, including the structural arrangement of a motor included in a debris removal apparatus. Examples of locations considered suitable to position a lengthwise axis of a shaft relative to a shaft include those in which a lengthwise axis is centrally located through a portion, or the entirety, of the length of a shaft, those in which a lengthwise axis is centrally located through a first portion, second portion, and/or third portion of a shaft, those in which a lengthwise axis extends through a center of a passageway defined by a shaft at a first end of the shaft and a second end of the shaft, those in which a lengthwise axis extends through a passageway defined by a shaft at a first end of a shaft and a second end of the shaft, those in which a lengthwise axis extends through a center of a passageway along a portion of a length of a shaft, those in which a lengthwise axis extends through a center of a passageway along a first portion, a second portion, and/or a third portion of a shaft, those in which a lengthwise axis extends through a passageway along a portion of a length of a shaft, those in which a lengthwise axis extends through a passageway along a first portion, a second portion, and/or a third portion of a shaft, those in which a lengthwise axis extends through a center of an opening defined at a second end of a shaft and through a center of a passageway defined by the shaft along a first portion, a second portion, and/or a third portion of a shaft, those in which a lengthwise axis extends through an opening defined at a second end of a shaft and through a center of a passageway defined by the shaft along a first portion, a second portion, and/or a third portion of a shaft, those in which a lengthwise axis extends through an opening defined at a second end of a shaft and through a passageway defined by the shaft along a first portion, a second portion, and/or a third portion of a shaft, and any other location considered suitable for a particular embodiment.

While the outside diameters 37, 43, 49, the inside diameters 39, 45, 51, and the lengths 41, 47, 53 have been illustrated as having specific structural arrangements, a shaft can have any suitable structural arrangement that includes any suitable outside diameter, inside diameter, and/or length along a first portion, a second portion, and/or third portion of a shaft. Selection of a suitable outside diameter, inside diameter, and/or length for a first portion, a second portion, and/or third portion of a shaft can be based on various considerations, including the desired air flow through a passageway defined by a shaft. Examples of outside diameters considered suitable for a first portion, second portion, and/or third portion (e.g., outside diameter 37, outside diameter 43, outside diameter 49) of a shaft include those equal to, greater than, less than, or about 0.75 inches, 1 inch, 1.25 inches, 1.5 inches, 1.75 inches, 2 inches, 2.25 inches, 2.5 inches, 2.75 inches, 3 inches, outside diameters between about 0.5 inches and 3 inches, and any other outside diameter considered suitable for a particular embodiment. In the illustrated embodiment, the outside diameters 37, 43, 49 are equal to about 1.25 inches. Examples of lengths considered suitable for a shaft (e.g., length 35) include lengths greater than, less than, equal to, or about 40 inches, 41 inches, 42 inches, 43 inches, 44 inches, 45 inches, 46 inches, 47 inches, 48 inches, 49 inches, 50 inches, lengths between about 12 inches and about 60 inches, and any other length considered suitable for a particular embodiment. In the illustrated embodiment, the length 35 is equal to about 44 inches. Examples of lengths considered suitable for a first portion of a shaft (e.g., length 41) include lengths greater than, less than, equal to, or about 8 inches, 9 inches, 10 inches, 11 inches, 12 inches, 13 inches, 14 inches, 15 inches, 16 inches, lengths between about 5 inches and about 30 inches, lengths greater than, less than, equal to, or about the length of a second portion and/or third portion, and any other length considered suitable for a particular embodiment. Examples of lengths considered suitable for a second portion of a shaft (e.g., length 47) include lengths greater than, less than, equal to, or about 20 inches, 21 inches, 22 inches, 23 inches, 24 inches, 25 inches, 26 inches, 27 inches, 28 inches, 29 inches, 30 inches, lengths between about 10 inches and about 40 inches, lengths greater than, less than, equal to, or about the length of a first portion and/or third portion, and any other length considered suitable for a particular embodiment.

Examples of lengths considered suitable for a third portion of a shaft (e.g., length 53) include lengths greater than, less than, equal to, or about 3 inches, 4 inches, 5 inches, 6 inches, 7 inches, 8 inches, 9 inches, 10 inches, 11 inches, 12 inches, lengths between about 2 inches and about 15 inches, lengths greater than, less than, equal to, or about the length of a first portion and/or second portion, and any other length considered suitable for a particular embodiment. Examples of inside diameters considered suitable for a first portion, second portion, and/or third portion (e.g., inside diameter 39, inside diameter 45, inside diameter 51) of a shaft include inside diameters equal to, greater than, less than, or about 0.5 inches, 0.75 inches, 0.875 inches, 1 inch, 1.25 inches, 1.5 inches, those between about 0.5 inches and about 3 inches, and any other inside diameter considered suitable for a particular embodiment.

In the illustrated embodiment, the plurality of inlet openings 48 is disposed on the third portion 40 of the shaft 16 and between the energy source 18 and the motor 20. Thus, each opening of the plurality of inlet openings 48 is disposed on a portion of the shaft 16 that extends from the second end 34 toward the first end 32. The plurality of inlet openings 48 are disposed on the third portion 40 such that a first end 75 of the plurality of inlet openings 48 is disposed a first distance from the second end 34 of the shaft 16 and a second end 77 of the plurality of inlet openings 48 is disposed a second distance from the second end 34 of the shaft 16. The first distance and second distance can be any suitable distance and selection of a suitable location to position a plurality of inlet openings can be based on various considerations, including the location of a motor included in a debris removal apparatus. Examples of distances considered suitable to position a first end of a plurality of inlet openings from a second end of a shaft include distances equal to, greater than, less than, or about 2.5 inches, 3 inches, 4 inches, 5 inches, 6, inches, 7 inches, 7.5 inches, distances between about 2 inches and about 15 inches, and any other distance considered suitable for a particular embodiment. In the illustrated embodiment, the first distance is equal to 5 inches. Examples of distances considered suitable to position a second end of a plurality of inlet openings from a second end of a shaft include distances equal to, greater than, less than, or about 2 inches, 2.5 inches, 3 inches, 3.5 inches, 4 inches, 4.5 inches, 5 inches, distances between about 1.5 inches and about 7 inches, and any other distance considered suitable for a particular embodiment. In the illustrated embodiment, the second distance is equal to 3.5 inches.

Each opening of the plurality of inlet openings 48 is an elongated opening that extends through the main body 31 of the shaft 16 and provides access to the passageway 46 such that the passageway 46 is in fluid communication with an environment exterior to the passageway 46. Each opening of the plurality of openings 48 has a length 55 and a width 57 that is less than the length 55. The plurality of inlet openings 48 are arranged such a set of openings 59 of the plurality of openings 48 are disposed in a ring 61 of a plurality of rings 63. Each ring 61 within the plurality of rings 63 is disposed on a separate hypothetical plane 65 that is disposed orthogonally to the lengthwise axis 30 of the shaft 16. Each opening in the set of openings 59 is separated from an adjacent opening in the ring 61 by a portion 67 of the main body 31 of the shaft 16.

While the plurality of inlet openings 48 has been illustrated as disposed on the third portion 40 of the shaft 16 between the energy source 18 and the motor 20 and such that a set of openings of the plurality of openings are disposed in a ring 61 of a plurality of rings 63, any suitable number of inlet openings can be positioned at any suitable location on a shaft and in any suitable configuration. Selection of a suitable number of inlet openings and of a suitable location and configuration to position a plurality of inlet openings can be based on various considerations, such as the desired fluid flow through a plurality of inlet openings. Examples of suitable numbers of inlet openings to define on a shaft include at least one, two, a plurality, three, four, five, more than five, more than ten, more than twenty, for than thirty, more than forty, more than fifty, and any other number considered suitable for a particular embodiment. Examples of suitable locations to position a plurality of inlet openings include on a first portion of a shaft, on a second portion of a shaft, on a third portion of a shaft, on a first portion and second portion of a shaft, on a second portion and third portion of a shaft, on a first portion and third portion of a shaft, on a first portion, second portion, and third portion of a shaft, and any other location considered suitable for a particular embodiment. Examples of suitable configurations to position a plurality of inlet openings include such that a set of a plurality of openings, or each opening in a plurality of openings, is disposed on a hypothetical plane that is disposed at an angle (e.g., orthogonal, acute, obtuse) relative to a lengthwise axis of a shaft, and any other configuration considered suitable for a particular embodiment.

While the each opening in the plurality of inlet openings 48 has been illustrated as an elongate opening, an inlet opening can have any suitable structural arrangement and any suitable dimensions. Selection of a suitable structural arrangement and dimensions for an inlet opening can be based on various considerations, including the desired fluid flow through an inlet opening. Examples of suitable structural arrangements for an inlet opening include inlet openings that have cross-sectional configurations that are elongated, rectangular, square, circular, oval, and any other configuration considered suitable for a particular embodiment. Examples of suitable dimensions for an inlet opening of a plurality of inlet openings include those in which all of the openings of a plurality of inlet openings have the same dimensions, each opening of a plurality of inlet openings has dimensions that are different than the dimensions of the other openings in the plurality of inlet openings, each opening in a first set of openings in a plurality of inlet openings has a first dimension and each opening in a second set of openings in the plurality of inlet openings has a second dimension that is different than the first dimension, and any other dimensions considered suitable for a particular embodiment.

In the illustrated embodiment, the shaft 16 is formed of a single, unitary piece of material. However, alternative embodiments of a debris removal apparatus can include a shaft that includes multiple pieces of material attached (e.g., releasably, fixedly, rotatably, pivotably) to one another. Examples of numbers of pieces of material considered suitable to form a shaft include one, at least one, two, a plurality, three, four, five, more than five, and any other number considered suitable for a particular embodiment. For example, a shaft can include three pieces of material attached to one another. A first piece of material forms a first portion of a shaft, a second piece of material forms a second portion of the shaft, and a third piece of material forms a third portion of the shaft. The first piece of material can be attached (e.g., releasably, fixedly, rotatably, pivotably) to the second piece of material and the second piece of material can be attached (e.g., releasably, fixedly, rotatably, pivotably) to the third piece of material.

A shaft can be formed of any suitable material and manufactured using any suitable method or technique and selection of a suitable material to form a shaft and of a suitable method or technique to manufacture a shaft can be based on various considerations, including the intended use of a debris removal apparatus of which the shaft is a component. Examples of materials considered suitable to form a shaft, or a portion of a shaft (e.g., first portion, second portion, third portion), include metals, polymers, rigid materials, tubular members, elongate members with a solid or hollow cross-section, members with any suitable cross-sectional configuration, such as circular, oval, square, rectangular, or any other shape, combinations of the materials described herein, and any other material considered suitable for a particular embodiment. Optionally, a portion of a shaft (e.g., first portion, second portion, and/or third portion) can include a coating, or covering, that increases the grip between the shaft and a hand of a user during use. Examples of methods and techniques considered suitable to manufacture a shaft include conventional forming and/or manufacturing techniques, 3D-printing, injection molding, casting, combinations of the methods and/or techniques described herein, and any other method and/or technique considered suitable for a particular embodiment.

In the illustrated embodiment, the energy source 18 is operatively connected to the motor 20 via the switch 24, as described in more detail herein, and is disposed on the first portion 36 of the shaft 16 within the passageway 46. Any suitable energy source can be included in a debris removal apparatus and selection of a suitable energy source can be based on various considerations, including the intended use of the debris removal apparatus of which the energy source is a component. Examples of energy sources considered suitable to include in a debris removal apparatus and/or operatively connect to a motor and/or a switch of a debris removal apparatus include energy storage devices capable of storing electrical energy and providing electrical energy to a motor, energy storage devices capable of storing electrical energy and providing electrical energy to a motor for a reasonable period of time (e.g., more than ten minutes, more than thirty minutes, more than one hour), one or more batteries, single use batteries, rechargeable batteries, lithium ion batteries, capacitors, ultracapacitors, replaceable energy sources, conventional power cords capable of attachment to conventional outlets, AC adaptors, DC adaptors, AC/DC adaptors, combinations of the energy sources described herein, and any other energy source or component of an energy source considered suitable for a particular embodiment. Optionally, a debris removal apparatus can include a conventional status indicator that illustrates the amount of energy contained in an energy source.

In the illustrated embodiment, the motor 20 is operatively connected to the energy source 18 via the switch 24, as described in more detail herein, and is disposed on the third portion 40 of the shaft 16 within the passageway 46 between the plurality of inlet openings 48 and the second end 34 of the shaft 16. The motor 20 has a lengthwise axis 56, a housing 58 attached to the shaft 16, a drive shaft 60, an off state, and an on state. The motor 20 is positioned within the shaft 16 a distance 79 from the second end 34 of the shaft 16 and such that the portion of the motor 20 to which the second set of conductive wires 76, as described in more detail herein, is attached is disposed between the fan 22 and the second end 34 of the shaft 16. The lengthwise axis 56 of the motor 20 extends through the drive shaft 60 and is parallel to the lengthwise axis 30 of the shaft 16. When the motor 20 is in the on state the drive shaft 60 rotates relative to the shaft 16. When the motor 20 is in the off state the drive shaft 60 does not rotate relative to the shaft 16 (e.g., the drive shaft 60 is fixed relative to the shaft 16).

Any suitable motor can be included in a debris removal apparatus and selection of a suitable motor can be based on various considerations, including the desired airflow intended to be achieved during use. Examples of motors considered suitable to include in a debris removal apparatus include ducted motors, variable speed motors, electric ducted fan motors, motors that have a maximum draw between about 10 amps and about 25 amps, combinations of the motors described herein, and any other motor considered suitable for a particular embodiment. A motor can be positioned at any suitable location within shaft and disposed any suitable distance from a second end of a shaft. Examples of distances considered suitable to position a motor from a second end of a shaft include distances equal to, greater than, less than, or about 0.5 inches, 0.75 inches, 1 inch, 1.25 inches, 1.5 inches, 1.75 inches, 2 inches, distances between about 0.25 inches and about 4 inches, and any other distance considered suitable for a particular embodiment. In the illustrated embodiment, the distance 79 is equal to about 1 inch.

While the lengthwise axis 56 of the motor 20 has been illustrated as extending through the drive shaft 60 and being parallel to the lengthwise axis 30 of the shaft 16, a lengthwise axis of a motor can extend through a drive shaft of the motor and be positioned at any suitable angle relative to a lengthwise axis of a shaft. Selection of a suitable angle to position a lengthwise axis of a motor relative to a lengthwise axis of a shaft can be based on various considerations, including the direction it is desired to direct airflow. Examples of angles considered suitable to position a lengthwise axis of a motor relative to a lengthwise axis of a shaft include angles that position a lengthwise axis of a motor at an acute angle relative to a lengthwise axis of a shaft, at an obtuse angle relative to a lengthwise axis of a shaft, angles that position a lengthwise axis of a motor such that that it is parallel to a lengthwise axis of a shaft, angles that position a lengthwise axis of a motor such that that it is coaxial with a lengthwise axis of a shaft, and any other angle considered suitable for a particular embodiment.

An energy source and motor can be attached to a shaft using any suitable technique or method of attachment and selection of a suitable technique or method of attachment between an energy source and a shaft and between a motor and a shaft can be based on various considerations, including the material that forms an energy source, a motor (e.g., motor housing), and/or a shaft. Examples of techniques and methods of attachment considered suitable between an energy source and a shaft and between a motor and a shaft include using threaded connections, snap fit attachments, using one or more connectors, one or more mating slots and projections, tapered attachments, adhesives, direct attachments between the components, combinations of the techniques and/or methods described herein, and any other technique or method of attachment considered suitable for a particular embodiment. For example, alternative to a motor including a housing, a motor can be directly attached to a shaft using any suitable method or technique.

The fan 22 is attached to the drive shaft 60 of the motor 20 and is disposed in the third portion 40 of the shaft 16 within the passageway 46. In the illustrated embodiment, the fan 22 has a hub 62 and a plurality of blades 64. The hub 62 is attached to the drive shaft 60 such that movement of the drive shaft 60 results in movement of the fan 22. Each blade of the plurality of blades 64 has a blade root 66 attached to the hub 62 and a blade tip 68. Each blade of the plurality of blades 64 extends from the blade root 66 to the blade tip 68. The fan 22 is disposed a distance 69 from the second end 34 of the shaft 16 and a distance 71 from the first end 32 of the shaft 16. Depending on the type of motor being utilized in a debris removal apparatus, optionally, a fan 22 can also be disposed within the housing of a motor 20.

A fan 22 included in a debris removal apparatus can have any suitable structural configuration, be attached to a motor (e.g., drive shaft 60) using any suitable technique or method of attachment, be disposed any suitable distance from a second end of a shaft, and be disposed any suitable distance from a first end of a shaft. Selection of a suitable structural arrangement, a suitable technique or method of attachment, and a suitable distance to position a fan from a second end and/or first end of a shaft can be based on various considerations, including the structural arrangement of the shaft within which the fan is disposed. Examples of suitable structural arrangements considered suitable for a fan include those in which air is moved, or compressed, through a passageway defined by a shaft when the motor is in the on state from a location between the motor and a first end of the shaft and toward the second end of the shaft, axial driven fans, and any other structural configuration considered suitable for a particular embodiment. Examples of techniques and methods of attachment considered suitable between a fan and a motor (e.g., drive shaft) include using threaded connections, snap fit attachments, using one or more connectors, one or more mating slots and projections, set screws, tapered attachments, adhesives, combinations of the techniques or methods described herein, and any other technique or method of attachment considered suitable for a particular embodiment. Examples of distances considered suitable to position a fan (e.g., top of fan, bottom of fan) relative to a second end of a shaft (e.g., distance 69) include distances equal to, less than, greater than, or about 1 inch, 2 inches, 3 inches, 4 inches, 5 inches, 6 inches, 7 inches, 8 inches, 9 inches, 10 inches, distances between about 0.5 inches and about 10 inches, and any other distance considered suitable for a particular embodiment. In the illustrated embodiment, the fan 22 (e.g., top of fan, bottom of fan) is disposed 3 inches from the second end 34 of the shaft 16. Examples of distances considered suitable to position a fan (e.g., top of fan, bottom of fan) relative to a first end of a shaft (e.g., distance 71) include distances equal to, less than, greater than, or about 35 inches, 36 inches, 37 inches, 38 inches, 39 inches, 40 inches, 41 inches, 42 inches, 43 inches, 44 inches, distances between about 30 inches and about 50 inches, and any other distance considered suitable for a particular embodiment. In the illustrated embodiment, the fan 22 (e.g., top of fan, bottom of fan) is disposed 41 inches from the first end 32 of the shaft 16.

An example motor and fan are illustrated in FIGS. 38 and 39 as components of an electric ducted fan motor 3010 that can be utilized in a debris removal apparatus, such as those described herein. In the illustrated embodiment, the electric ducted fan motor 3010 has a housing 3012, a motor 3020, a fan 3022, a fairing cone 3024, and attachment members 3026. The motor 3020 is attached to the housing 3012 using a first set 3028 of attachment members 3026. The fan 3022 is attached to the motor using a second set 3030 of attachment members 3026. The fairing cone 3024 is attached to an end of the motor 3020. When utilized in a debris removal apparatus, the electric ducted fan motor 3010 is slid into a second end of a shaft and attached to the shaft using any suitable technique or method of attachment, such as those described herein (e.g., adhesive, mounting screws, retaining ring). For example, a housing 3012 can directly contact the main body of a shaft and be releasably, or fixedly, attached to the main body of the shaft.

As shown in FIG. 6, the switch 24 is attached to the first end 32 of the shaft 16 such that a portion of the switch 24 is disposed within the first portion 36 of the shaft 16 and within the passageway 46. The switch 24 is attached to the shaft 16 using a housing 70, a lock nut 72, and an o-ring 73. The switch 24 is operatively connected to the energy source 18 using a first set of conductive wires 74 and is operatively connected to the motor 20 using a second set of conductive wires 76. The switch 24 is moveable between a first position and a second position. Movement of the switch 24 between the first and second positions moves the motor 20 between its off and on states. The motor 20 is in the off state when the switch 24 is in the first position and the motor 20 is in the on state, and operatively connected to the energy source 18, when the switch 24 is in the second position. The o-ring 73 is disposed between the housing 70 and the shaft 16 to prevent moisture from entering the passageway 46 during use.

Any suitable type of switch, having any suitable structural arrangement, can be included in a debris removal apparatus and a switch included in a debris removal apparatus can be attached to a shaft using any suitable technique or method of attachment. Selection of a suitable type of switch, structural arrangement for a switch, and of a suitable technique or method of attachment between a switch and a shaft can be based on various considerations, including the intended use of a debris removal apparatus of which the switch is a component. Examples of switches considered suitable to include in a debris removal apparatus include toggle switches, paddle switches, timer switches, touch switches, rotatable switches, rotatable variable speed controllers, switches that are used in combination with an electronic speed control (ESC), switches that are used in combination with a potentiometer, combinations of those described herein, and any other switch considered suitable for a particular embodiment. Examples of techniques and methods of attachment considered suitable between a switch and a shaft include using threaded connections, snap fit attachments, using one or more connectors, one or more mating slots and projections, tapered attachments, adhesives, direct attachments (e.g., such that a switch is directly attached to a shaft), combinations of the techniques and/or methods described herein, and any other technique or method of attachment considered suitable for a particular embodiment. Depending on the structural arrangement of a switch included in a debris removal apparatus, a housing, lock nut, and/or o-ring can be omitted from a debris removal apparatus or similar structure can be formed by a main body of a shaft.

While switch 24 has been illustrated as disposed at the first end 32 of the shaft 16 within the passageway 46, alternative embodiments can position a switch at any suitable location on a shaft. Examples of locations considered suitable to position a switch on a shaft include on a portion of a shaft (e.g., first portion, second portion, third portion), on a side surface of a shaft, at an end of a shaft, between a first end of a shaft and a second end of a shaft, such that a portion, or the entirety, of the switch is disposed within a portion of a shaft (e.g., first portion, second portion, third portion), between a first end of a shaft and a motor, between a second end of a shaft and a motor, on a handle of a debris removal apparatus, combinations of the locations described herein, and any other location considered suitable for a particular embodiment.

While the switch 24 has been illustrated as being operatively connected to the energy source 18 and motor 20 using particular structures and/or components and as being operatively connected using a particular configuration between the components, a switch can be operatively connected to an energy source and/or motor, an energy source can be operatively connected to a switch and/or motor, and/or a motor can be operatively connected to an energy source and/or switch in any suitable configuration such that energy can be provided to a motor and/or the motor is moveable between off and on states. Selection of suitable structures and/or components can be based on various considerations, including the type of energy source and/or motor included in a debris removal apparatus. Examples of structures and/or components considered suitable to include in a debris removal apparatus to operatively connect a switch to an energy source and/or motor include conductive wires, fuses, conventional electric adaptors that are sized and configured to be plugged into an electric outlet, DC adaptors, AC adaptors, AC/DC adaptors, combinations of the structures and components described herein, and any other structure and/or component considered suitable for a particular embodiment. Any of the example structures and/or components used to operatively connect a switch to an energy source and/or motor described herein can be included in a debris removal apparatus and housed within any suitable portion of a shaft, such as a passageway, and in any other portion of a debris removal apparatus considered suitable for a particular embodiment.

As shown in FIGS. 4 and 7, the debris removal apparatus 10 includes an insert 80 that is disposed on the third portion 40 and within the passageway 46. The insert 80 has a lengthwise axis 81, a first end 82, a second end 84, and a main body 86 that defines a first opening 88 at the first end 82, a second opening 90 at the second end 84, and a passageway 92 extending from the first opening 88 to the second opening 90. The lengthwise axis 81 of the insert 80 extends through the center of the passageway 92 at the first end 82 and the second end 84 and is coaxial with the lengthwise axis 30 of the shaft 16. The passageway 92 has a first inside diameter 83 at the first end 82 and a second inside diameter 85 at the second end 84. The thickness of the main body 86 tapers from the second end 84 to the first end 82 resulting in a main body 86 that has a second inside diameter 85 that is less than the first inside diameter 83. The inclusion of an insert 80 is considered advantageous at least because it provides a mechanism for increasing and/or optimizing airflow exiting the shaft 16 at the second end 34 during use. While debris removal apparatus 10 has been illustrated as including an insert 80, alternative embodiments of a debris removal apparatus can omit an insert.

While the insert 80 has been illustrated as having a particular structural arrangement, positioned at a particular location on a shaft, and as having a lengthwise axis 81 that is coaxial with the lengthwise axis 30 of the shaft 16, an insert can have any suitable structural arrangement, be positioned at any suitable location on a shaft, be formed of any suitable material, and have a lengthwise axis positioned at any suitable angle relative to a lengthwise axis of a shaft. Selection of a suitable structural arrangement for an insert, location to position an insert, material to form an insert, and of a suitable angle to position a lengthwise axis of an insert relative to a lengthwise axis of a shaft can be based on various considerations, including the intended use of a debris removal apparatus of which the insert is a component. Examples of suitable structural arrangements for an insert included in a debris removal apparatus include those in which the insert defines a passageway that tapers along a portion, or the entirety of its length, those in which the insert defines one or more steps or spiral protrusions within a passageway, those in which the thickness of the insert is constant along its length, those in which the insert is formed by a main body of a shaft, combinations of the structural arrangements described herein, and any other structural arrangement considered suitable for a particular embodiment. Examples of locations considered suitable to position an insert include those in which a portion, or the entirety, of the insert is disposed within a passageway defined by a shaft, an end of the insert (e.g., second end) is disposed within a passageway or coplanar with a second end of a shaft, and any other location considered suitable for a particular embodiment. Examples of materials considered suitable to form an insert include those described herein with respect to forming a shaft, and any other material considered suitable for a particular embodiment. Examples of angles considered suitable to position a lengthwise axis of an insert relative to a lengthwise axis of a shaft include angles that are acute, obtuse, angles that position a lengthwise axis of an insert such that that it is parallel to a lengthwise axis of a shaft, angles that position a lengthwise axis of an insert such that that it is coaxial with a lengthwise axis of a shaft, and any other angle considered suitable for a particular embodiment.

Figure 2:
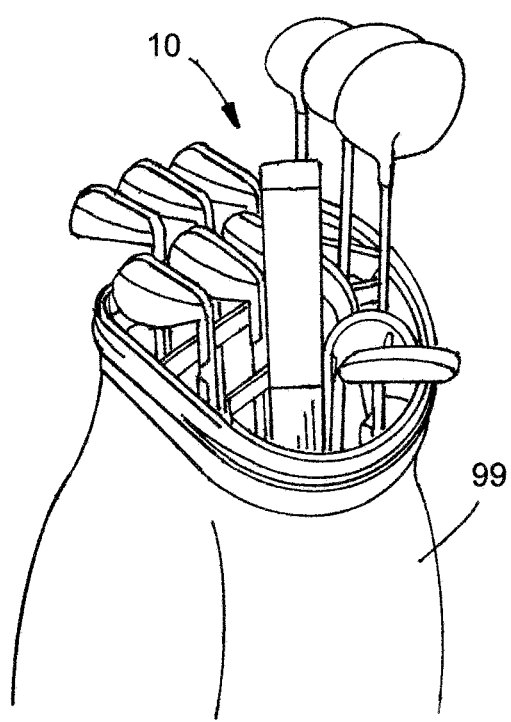
FIG. 2 is a perspective view of the debris removal apparatus illustrated in FIG. 1 stored in a golf bag.
Figure 3:
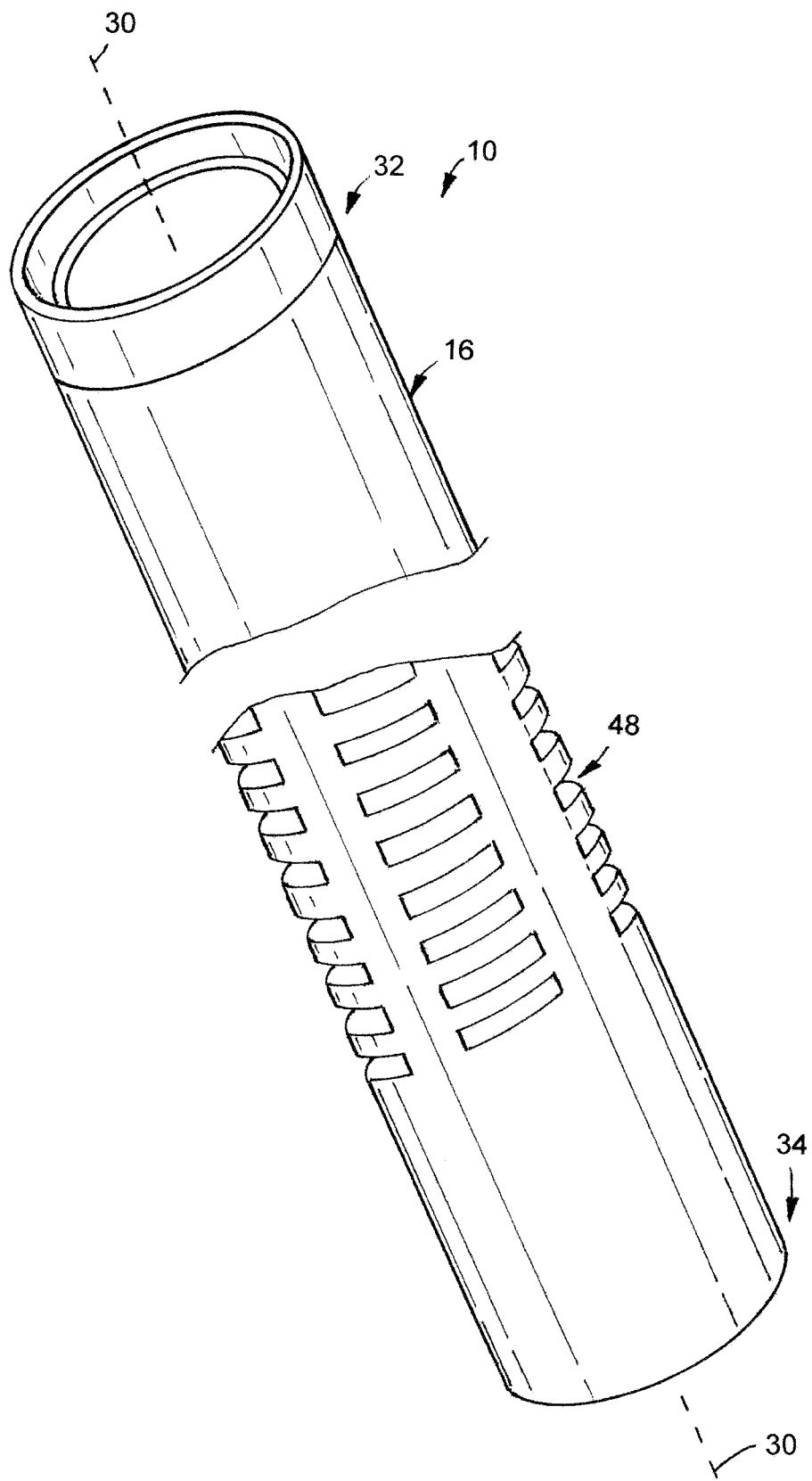
FIG. 3 is a partial perspective view of the debris removal apparatus illustrated in FIG. 1.

In use, when the switch 24 is in the second position and the motor 20 is in the on state, the fan 22 pulls air through the plurality of inlet openings 48 and into the passageway 46 defined by the shaft 16. The air travels through the passageway 46, past the motor 20, and exits the passageway 46 through the second opening 44. As illustrated in FIGS. 1 and 2, the debris removal apparatus 10 is considered advantageous at least because it is a hand-held device that provides a mechanism for a user to remove debris 94 from a surface 96 while standing upright, without having to bend over, and positions the apparatus 10 closer to the surface 96 relative to other debris removal apparatus. In addition, the overall structural arrangement of the debris removal apparatus 10 is ergonomic and allows for the apparatus to be stored in any suitable storage container, such as a golf bag 99. Furthermore, the debris removal apparatus 10 is considered advantageous at least because it positions the motor 20 on a portion of the shaft 16 (e.g., third portion 40) that is located opposite to the portion of the shaft 16 (e.g., first portion 36) intended to be grasped by a user during use and which contains the energy source. This increases the overall balance of the device, increases the efficiency of the motor 20 and fan 22 due to their position relative to the surface 98 on which the apparatus 10 is being used (e.g., the motor 20 and fan 22 are in close proximity to the surface 98 relative to devices that do not include the structural arrangement of apparatus 10), increases the airflow through the second opening 44, and allows for the motor 20 and fan 22 to be smaller relative to devices that place these components in the handle or further away from the surface on which the apparatus is being used. In addition, placement of the motor 20 and fan 22, as shown in the illustrated embodiments, allows for the apparatus 10 to have an overall weight that is less than debris removal apparatus that position a motor and/or fan in different locations.

Figure 9:
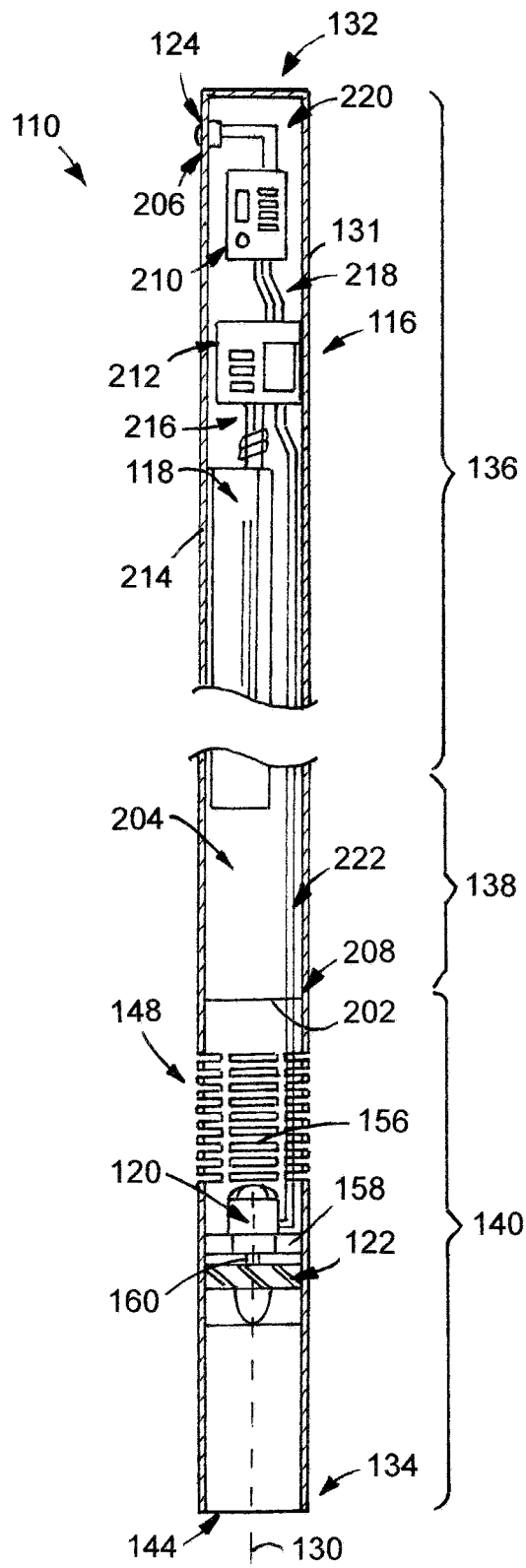
FIG. 9 is a partial cross-sectional view of a second example debris removal apparatus taken along the lengthwise axis of the shaft.

FIG. 9 illustrates a second example debris removal apparatus 110. The debris removal apparatus 110 is similar to the debris removal apparatus 10 illustrated in FIGS. 1, 2, 3, 4, 5, 6, 7, and 8 and described above, except as detailed below. The debris removal apparatus 110 has a shaft 116, an energy source 118, a motor 120, a fan 122, and a switch 124.

In the illustrated embodiment, the shaft 116 has a main body 131 that defines a sealed first end 132, a dividing wall 202, a chamber 204, a switch passageway 206, and a conductive wire passageway 208. The dividing wall 202 is disposed between the second and third portions 138, 140 of the shaft 116 and separates the second portion 138 from the third portion 140. The passageway 146 extends from the dividing wall 202 to the second opening 144. The chamber 204 is defined on the first and second portions 136, 138 of the shaft 116, extends from the dividing wall 202 to the first end 132, and is sized and configured to house a portion of the switch 124, the energy source 118, a potentiometer 210, an electronic speed control (ESC) 212, and a portion of the conductive wires, as described in more detail herein. The switch passageway 206 extends through a side wall 214 of the shaft 116 and is sized and configured to receive a portion of the switch 124. The conductive wire passageway 208 extends through the dividing wall 202 and is sized and configured to receive a portion of the fourth set of conductive wires 222, as described in more detail herein.

In the illustrated embodiment, the energy source 118 is operatively connected to the motor 120 via the switch 124, the potentiometer 210, and the electronic speed control (ESC) 212. As shown in FIG. 9, the energy source 118 is disposed on the first portion 136 and the second portion 138 of the shaft 116 within the chamber 204. The energy source 118 is operatively connected to the electronic speed control (ESC) 212 using a first set of conductive wires 216, the electronic speed control (ESC) 212 is operatively connected to the potentiometer 210 using a second set of conductive wires 218, the potentiometer 210 is operatively connected to the switch 124 using a third set of conductive wires 220, and the electronic speed control (ESC) 212 is operatively connected to the motor 120 using a fourth set of conductive wires 222. Any suitable potentiometer and/or electronic speed control (ESC) can be included in a debris removal apparatus and selection of a suitable type of potentiometer and/or electronic speed control (ESC) to include in a debris removal apparatus can be based on various considerations, including the type of motor included in a debris removal apparatus. For example, ESCs that are rated between about 25% to about 35% greater than the maximum possible draw from a motor utilized in a debris removal apparatus are considered suitable. An example ESC considered suitable includes a 20 amp ESC.

The switch 124 is attached to the shaft 116 using a threaded connection between the switch 124 and the shaft 116. The switch 124 is operatively connected to the energy source 118 and is operatively connected to the motor 120. The switch 124 is moveable between a first position and a second position. Movement of the switch 124 between the first and second positions moves the motor 120 between its off and on states.

In the illustrated embodiment, the motor 120 is operatively connected to the energy source 118 and is disposed on the third portion 140 of the shaft 116 within the passageway 146 between the plurality of inlet openings 148 and the second end 134 of the shaft 116. The motor 120 has a lengthwise axis 156, a housing 158 attached to the shaft 116, a drive shaft 160, an off state, and an on state. The motor 120 is positioned within the shaft 116 such that the portion of the motor 120 to which the fourth set of conductive wires 222 is attached is disposed between the plurality of inlet openings 148 and the fan 122. The lengthwise axis 156 of the motor 120 extends through the drive shaft 160 and is coaxial with the lengthwise axis 130 of the shaft 116.

Figure 10:
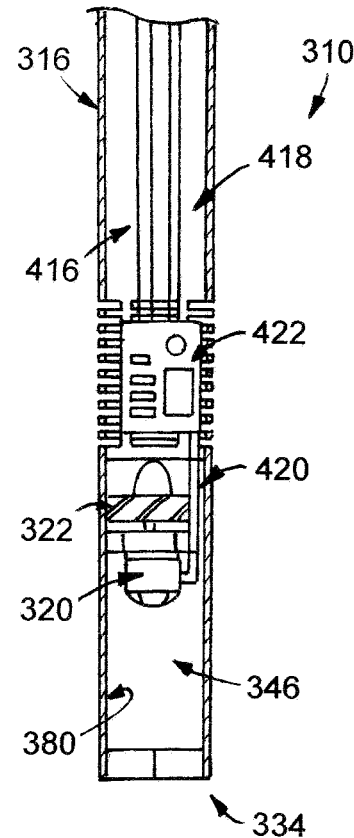
FIG. 10 is a partial cross-sectional view of a third example debris removal apparatus taken along the lengthwise axis of the shaft.

FIG. 10 illustrates a third example debris removal apparatus 310. The debris removal apparatus 310 is similar to the debris removal apparatus 110 illustrated in FIG. 9 and described above, except as detailed below. The debris removal apparatus 310 has a shaft 316, an energy source, a motor 320, a fan 322, and a switch.

In the illustrated embodiment, the shaft includes an insert 380 and the motor 320 is positioned within the shaft 316 such that the portion of the motor 320 to which the third set of conductive wires 420 is attached is disposed between the fan 322 and the second end 334 of the shaft 316. In addition, alternative to the inclusion of a separate ESC and potentiometer, the debris removal apparatus 310 includes a combined potentiometer and ESC 422. The energy source is operatively connected to the combined potentiometer and ESC 422 using a first set of conductive wires 416, the combined potentiometer and ESC 422 is operatively connected to the switch using a second set of conductive wires 418, and the combined potentiometer and ESC 422 is operatively connected to the motor 320 using a third set of conductive wires 420.

FIG. 11 illustrates a fourth example debris removal apparatus 510. The debris removal apparatus 510 is similar to the debris removal apparatus 110 illustrated in FIG. 9 and described above, except as detailed below. The debris removal apparatus 510 has a shaft 516, an energy source, a motor 520, a fan 522, and a switch.

In the illustrated embodiment, the debris removal apparatus 510 includes an air guide 630 disposed within the passageway 546 defined by the shaft 516, adjacent to the plurality of inlet openings 548, and between the motor 520 and the first end of the shaft 516. The air guide 630 has a first end 632, a second end 634, and a main body 636 that defines a curved outer surface 638. The first end 632 has a first outside diameter 633 and the second end 634 has a second outside diameter 635 that is less than the first outside diameter 633.

In use, when the switch is in the second position and the motor 520 is in the on state, the fan 522 pulls air through the plurality of inlet openings 548 and into the passageway 546 defined by the shaft 516 such that the air interacts with the air guide 630 and is concentrated toward the second end 534 of the shaft 516. The air travels through the passageway 546, past the motor 520, and exits the passageway 546 through the second opening 544. The inclusion of an air guide in a debris removal apparatus is considered advantageous at least because it provides a mechanism for increasing the efficiency of the apparatus during use.

While the air guide 630 has been illustrated as having a particular structural configuration and as being positioned at a particular location within the debris removal apparatus 510, an air guide can have any suitable structural configuration, be formed of any suitable material, and be positioned at any suitable location within a debris removal apparatus. Examples of suitable structural configurations for an air guide include those that define a frustoconical shape, those that have one or more vanes directing airflow toward a second end of a shaft, combinations of the structural configurations described herein, and any other structural configuration considered suitable for a particular embodiment. Examples of materials considered suitable to form an air guide include those described herein with respect to forming a shaft, and any other material considered suitable for a particular embodiment. Examples of locations considered suitable to position an air guide within a shaft include those in which an air guide is disposed within a passageway defined by a shaft, an air guide is positioned adjacent to a plurality of inlet openings, a first end of an air guide is positioned between a plurality of inlet openings and a first end of a shaft, a first end of an air guide is positioned between a first end of a plurality of inlet openings and a second end of a plurality of inlet openings, a first end of an air guide is positioned between a second end of a plurality of inlet openings and a second end of a shaft, a second end of an air guide is positioned between a plurality of inlet openings and a second end of a shaft, a second end of an air guide is positioned between a first end of a plurality of inlet openings and a second end of a plurality of inlet openings, a second end of an air guide is positioned between a first end of a plurality of inlet openings and a first end of a shaft, combinations of the locations described herein, and any other location considered suitable for a particular embodiment.

FIGS. 12, 13, 14, 15, and 16 illustrate a fifth example debris removal apparatus 710. The debris removal apparatus 710 is similar to the debris removal apparatus 110 illustrated in FIG. 9 and described above, except as detailed below. The debris removal apparatus 710 has a shaft 716, an energy source, a motor, a fan 722, and a switch.

In the illustrated embodiment, the second portion 738 is releasably attached to the third portion 740 using a threaded attachment 830. The second portion 738 defines a recess 832, threads 834 positioned within the recess 832, and includes contact plates 838. The recess 832 extends from a second end 840 of the second portion 738 toward the first end of the shaft 716 to a recess base 842. The contact plates 838 are disposed on the recess base 842 and are adapted to interact with the spring loaded contacts 848, as described in more detail herein. The fourth set of conductive wires 822 are operatively connected to the contact plates 838 and the electronic speed control (ESC).

The third portion 740 defines a projection 844, threads 846 positioned on the projection 844, and includes spring loaded contacts 848. The projection 844 extends from a first end 850 of the third portion 740 toward the second end of the shaft 716. The spring loaded contacts 848 are disposed on the projection 844 and are adapted to interact with the contact plates 838 such that the spring loaded contacts are operatively connected to the contact plates 838. A fifth set of conductive wires 852 extends from the spring loaded contacts 848 to the motor and are operatively connected to the spring loaded contacts 848 and the motor. This embodiment is considered advantageous at least because it provides a mechanism for removing a third portion of a shaft for repair, or to reduce of the overall size of the debris removal apparatus 710 for storage.

In an alternative embodiment, a first portion can include structure similar to that described with respect to the second end 840 of the second portion 738 and a first end of a second portion can include structure similar to that described with respect to the first end 850 of the third portion 740. This structural arrangement provides a mechanism to adjust the overall length of the apparatus during use such that a second portion can be removed and a first portion can be directly, and releasably, attached to a third portion.

FIGS. 17, 18, 19, 20, 21, and 22 illustrate a sixth example debris removal apparatus 910. The debris removal apparatus 910 is similar to the debris removal apparatus 710 illustrated in FIGS. 12, 13, 14, 15, and 16 and described above, except as detailed below. The debris removal apparatus 910 has a shaft 916, an energy source, a motor, a fan 922, and a switch.

Figure 17:
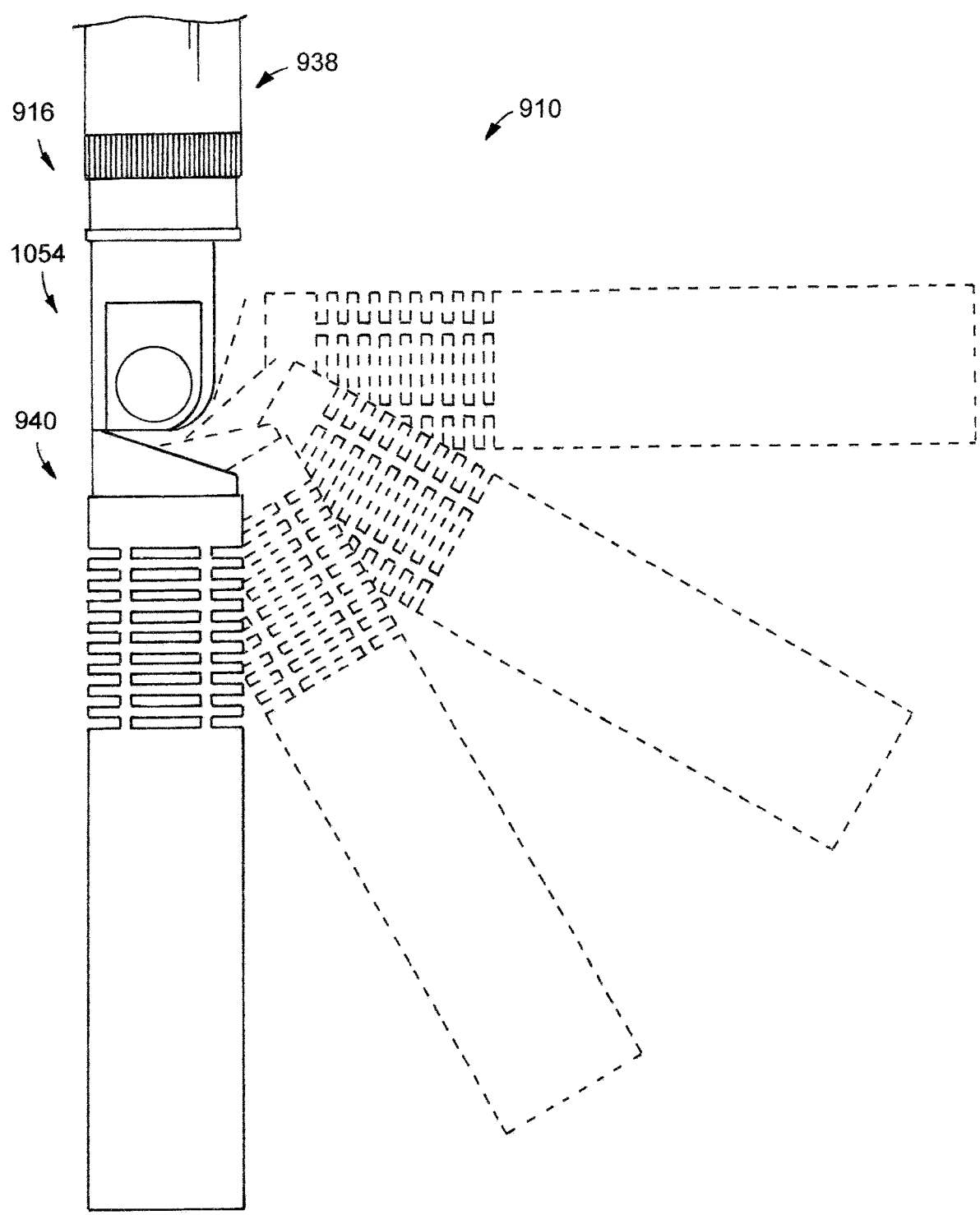
FIG. 17 is a partial elevation view of a sixth example debris removal apparatus.
Figure 18:
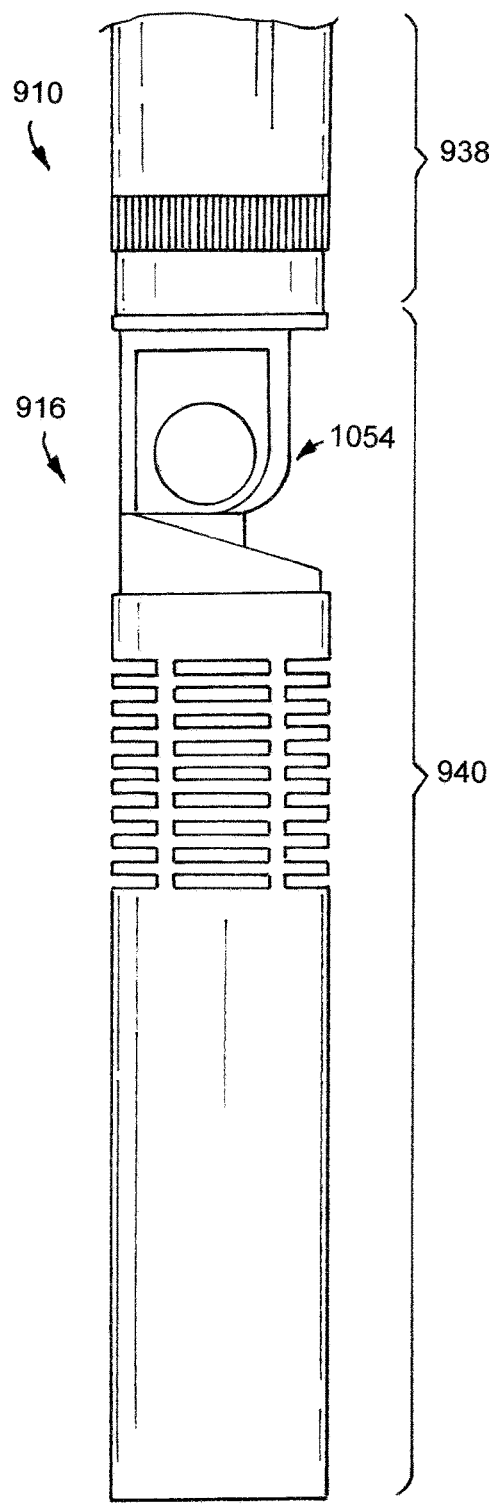
FIG. 18 is another partial elevation view of the debris removal apparatus illustrated in FIG. 17.
Figure 19:
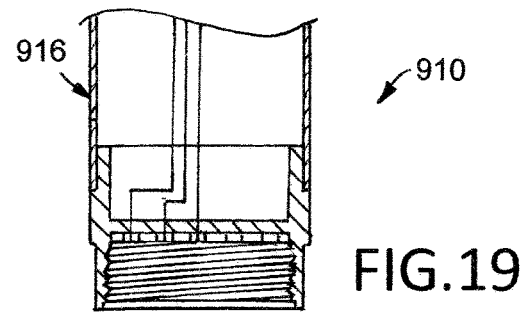
FIG. 19 is a partial cross-sectional view of the second portion of the debris removal apparatus illustrated in FIG. 17 taken along the lengthwise axis of the shaft.
Figure 20:
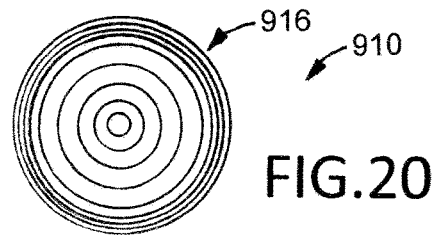
FIG. 20 is a bottom view of the second portion of the debris removal apparatus illustrated in FIG. 17.
Figure 21:
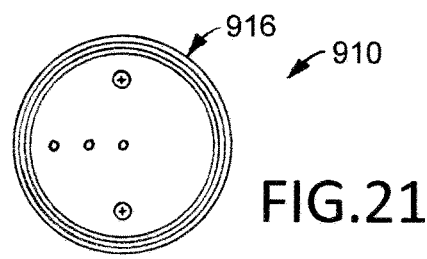
FIG. 21 is a top view of the third portion of the debris removal apparatus illustrated in FIG. 17.
Figure 22:
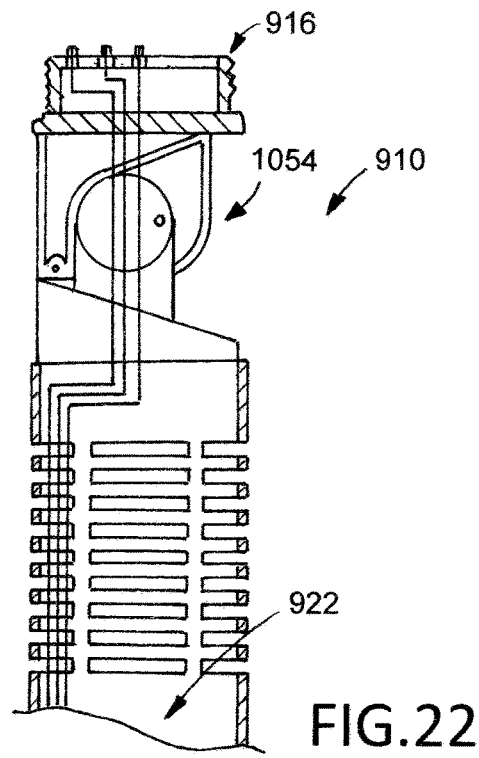
FIG. 22 is a partial cross-sectional view of the third portion of the debris removal apparatus illustrated in FIG. 17 taken along the lengthwise axis of the shaft.

In the illustrated embodiment, the third portion 940 of the shaft 916 includes a pivotable member 1054 that provides a mechanism for the third portion 940 to be pivoted relative to the first portion and second portion 938 of the shaft 916, as shown in phantom lines in FIG. 17. A third portion can be pivoted such that it is disposed at any suitable angle relative to a first portion and/or second portion. Examples of angles considered suitable to position a third portion relative to a first portion and/or second portion include acute angles, obtuse angles, angles that position a third portion at an angle equal to, greater than, less than, or about 0 degrees relative to a second portion, 30 degrees relative to a second portion, 45 degrees relative to a second portion, 60 degrees relative to a second portion, 90 degrees relative to a second portion, 120 degrees relative to a second portion, 150 degrees relative to a second portion, and any other angle considered suitable for a particular embodiment. Debris removal apparatus 910 is considered advantageous at least because it provides a structural arrangement that separates a motor and a fan from the portion of the shaft on which an energy source is disposed allowing the third portion of the apparatus to be pivoted such that airflow is directed in an efficient manner relative to apparatus that do not include this structural arrangement.

Figure 23:
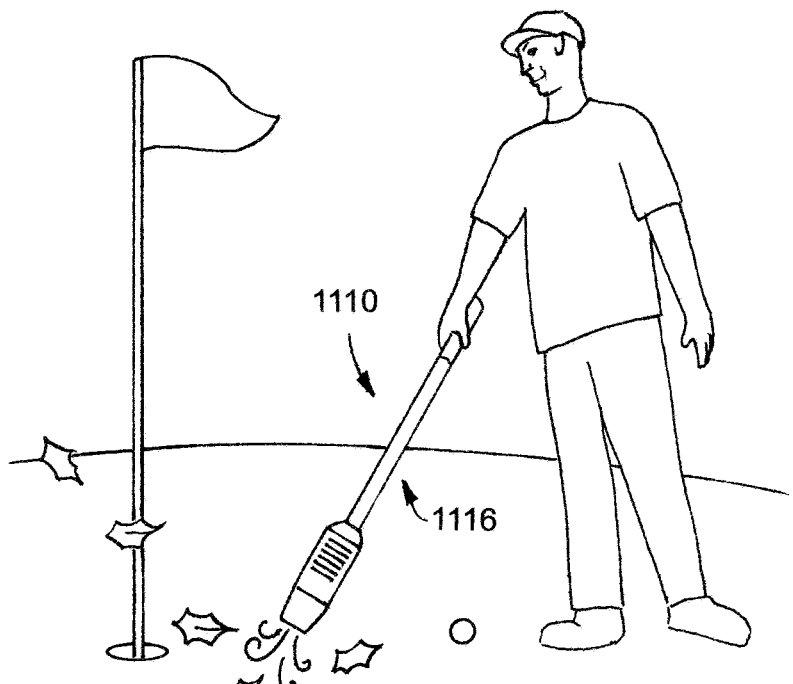
FIG. 23 is a perspective view of a user operating a seventh example debris removal apparatus.
Figure 24:
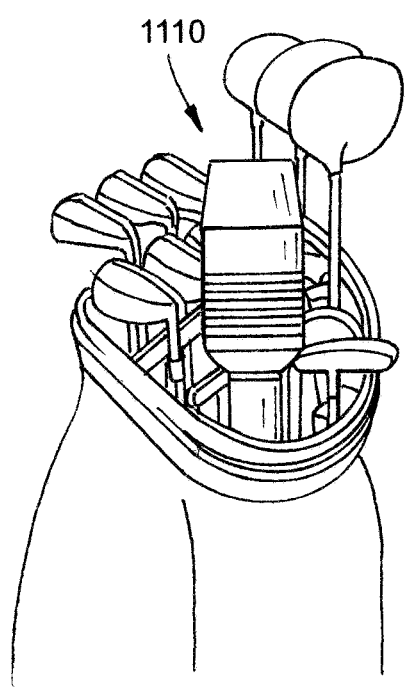
FIG. 24 is a perspective view of the debris removal apparatus illustrated in FIG. 23 stored in a golf bag.

FIGS. 23, 24, and 25 illustrate a seventh example debris removal apparatus 1110. The debris removal apparatus 1110 is similar to the debris removal apparatus 10 illustrated in FIGS. 1, 2, 3, 4, 5, 6, 7, and 8 and described above, except as detailed below. The debris removal apparatus 1110 has a shaft 1116, an energy source 1118, a variable speed motor 1120, a fan 1122, and a switch 1124.

In the illustrated embodiment, the first portion 1136 of the shaft 1116 is rotatably attached to the second portion 1138 of the shaft 1116 and the third portion 1140 of the shaft 1116 is fixedly attached to the second portion 1138 of the shaft 1116. The first portion 1136 has a first outside diameter 1137 and a first inside diameter 1139. The second portion 1138 has a second outside diameter 1143 and a second inside diameter 1145. The third portion 1140 has a third outside diameter 1149, a fourth outside diameter 1241, a third inside diameter 1151, and a fourth inside diameter 1243. The first outside diameter 1138 and the second outside diameter 1143 are equal to one another. Each of the third outside diameter 1149 and the fourth outside diameter 1241 is greater than the second outside diameter 1143. The third outside diameter 1149 extends from a location between the first and second ends 1240, 1242 of the third portion 1140 (e.g., disposed a distance equal to, greater than, less than, or about 6 inches from the second end 1134 of the shaft 1116, disposed a distance between about 3 inches and about 10 inches from the second end 1134 of the shaft 1116) toward a second end 1242 of the third portion 1140 (e.g., second end 1134 of the shaft 1116) to a location 1244 between the first and second ends 1240, 1242. The fourth outside diameter 1241 is disposed at the second end 1242 of the third portion 1140 and is less than the third outside diameter 1149. The outside diameter of the third portion 1140 tapers from the location 1244 between the first and second ends 1240, 1242 toward the second end of the third portion 1140. Examples of third outside diameters considered suitable for a third portion of a shaft (e.g., third outside diameter 1149) include outside diameters equal to, less than, greater than, or about 1.5 inches, 2 inches, 2.5 inches, 3 inches, 3.5 inches, outside diameters between about 1 inch and about 5 inches, and any other outside diameter considered suitable for a particular embodiment. In the illustrated embodiment, the third outside diameter 1149 is equal to about 2.5 inches. Examples of fourth outside diameters considered suitable for a third portion of a shaft (e.g., fourth outside diameter 1241) include outside diameters equal to, less than, greater than, or about 1.5 inches, 2 inches, 2.5 inches, 3 inches, 3.5 inches, outside diameters between about 1 inch and about 5 inches, outside diameters less than a third outside diameter, and any other outside diameter considered suitable for a particular embodiment. In the illustrated embodiment, the fourth outside diameter 1241 is less than the third outside diameter 1149.

The first inside diameter 1139 and the second inside diameter 1145 are equal to one another. Each of the third inside diameter 1151 and the fourth inside diameter 1243 is greater than the second inside diameter 1145. The third inside diameter 1151 extends from a location between the first and second ends 1240, 1242 of the third portion 1140 toward the second end 1242 of the third portion 1140 (e.g., second end 1134 of the shaft 1116) to a location 1246 between the first and second ends 1240, 1242. The fourth inside diameter 1243 is disposed at the second end 1242 of the third portion 1140 and is less than the third inside diameter 1151. The inside diameter of the third portion 1140 tapers from the location 1246 between the first and second ends 1240, 1242 toward the second end of the third portion 1140. While the third portion has been illustrated as having a particular structural arrangement, a third portion can have any suitable structural arrangement, such as those described herein. For example, a third portion can have an curved outer surface that extends from a first end of the third portion to a second end of a third portion, from a location between a first end and a second end of a third portion to the second end of the third portion, or from a first location between a first end and a second end of a third portion to a second location between a first end and a second end of the third portion to the second end of the third portion.

The structural arrangement of the third portion 1140 of the embodiment illustrated in FIGS. 23, 24, and 25 is considered advantageous at least because it provides a mechanism for increasing the efficiency of fluid flow through the debris removal apparatus 1110 and allows for a larger motor 1120 and fan 1122 to be included in the apparatus 1110 relative to apparatus that do not include the structural arrangement illustrated in FIGS. 23, 24, and 25.

In the illustrated embodiment, the switch 1124 comprises a rotatable variable speed controller 1250 disposed within the second portion 1138 of the shaft 1116. The rotatable variable speed controller 1250 is moveable between a first position and a second position and is operatively connected to an electronic speed control (ESC) 1252 that is disposed within a recess 1254 defined by the third portion 1140. The rotatable variable speed controller 1250 is operatively connected to the ESC 1252 using a first set of conductive wires 1256. Movement of the first portion 1136 of the shaft 1116 relative to the second portion 1138 of the shaft 1116 moves the rotatable variable speed controller 1250 between its first and second positions. Movement of the rotatable variable speed controller 1250 between its first and second positions moves the motor 1120 between its off and on states. The motor 1120 is in the off state when the rotatable variable speed controller 1250 is in the first position and the first portion 1136 is in its first position relative to the second portion 1138. The motor 1120 is in the on state when the rotatable variable speed controller 1250 is in the second position and the first portion 1136 is in its second position relative to the second portion 1138. Movement of the first portion 1136 relative to a second portion 1138 such that the first portion 1136 moves toward the second position relative to the second portion 1138 increases the flow of energy to the motor 1120 such that the motor 1120 increases its output. In addition, movement of the first portion 1136 relative to the second portion 1138 such that the first portion 1136 moves toward the first position relative to the second portion 1138 decreases the flow of energy to the motor 1120 such that the motor 1120 decreases its output. It is considered advantageous to utilize a variable speed control motor such that the airflow exiting a debris removal apparatus can be controlled during use such that damage to fragile material (e.g., plants) can be avoided and/or such that a controlled airflow can be used to accomplished various tasks, such as starting a campfire.

The energy source 1118 is disposed within the second portion 1138 and is operatively connected to the motor 1120 via the ESC 1252. The energy source 1118 is operatively connected to the ESC 1252 using a second set of conductive wires 1258. The ESC 1252 is operatively connected to the motor 1120 using a third set of conductive wires 1260.

Any suitable rotatable variable speed controller and/or electronic speed control (ESC) can be included in a debris removal apparatus and selection of a suitable type of rotatable variable speed controller and/or electronic speed control (ESC) to include in a debris removal apparatus can be based on various considerations, including the type of motor included in a debris removal apparatus.

FIG. 26 illustrates an eighth example debris removal apparatus 1310. The debris removal apparatus 1310 is similar to the debris removal apparatus 1110 illustrated in FIGS. 23, 24, and 25 and described above, except as detailed below. The debris removal apparatus 1310 has a shaft 1316, an energy source 1318, a variable speed motor 1320, a fan 1322, and a switch 1324.

In the illustrated embodiment, the energy source 1318 is located in the first portion 1336 of the shaft 1316, the first portion 1336 is rotatable relative to the second portion 1338 of the shaft 1316, and the third portion 1340 is fixed relative to the second portion 1338 of the shaft 1316. Movement of the first portion 1336 relative to the second portion 1338 moves the rotatable variable speed controller 1450 between its first and second positions.

Figure 27:
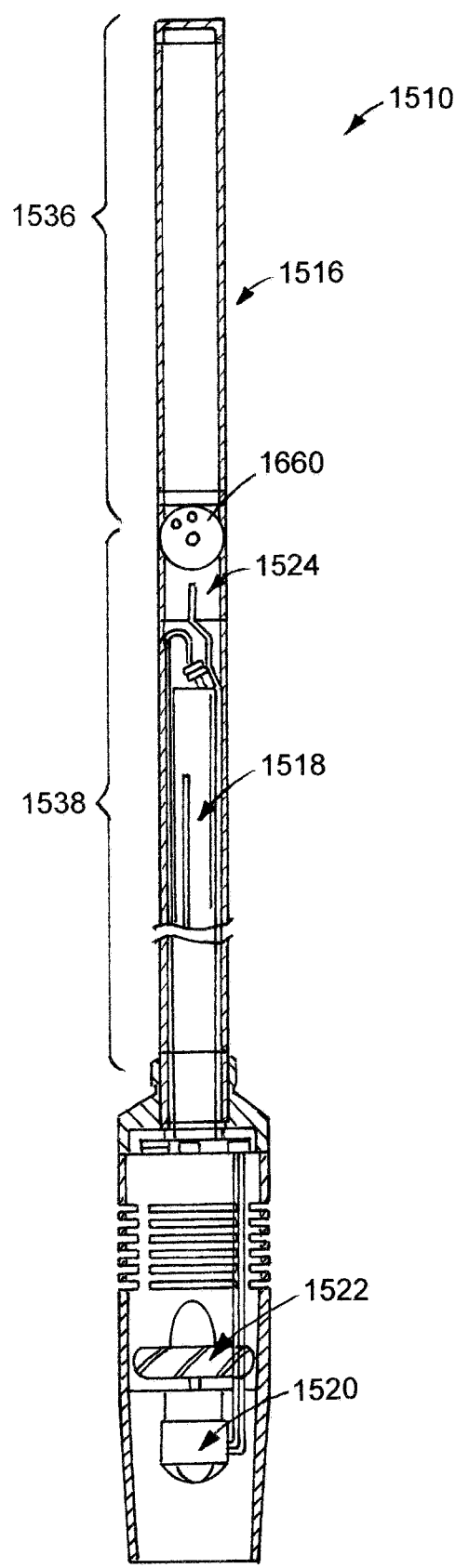
FIG. 27 is a partial cross-sectional view of a ninth example debris removal apparatus taken along the lengthwise axis of the shaft. The debris removal apparatus is in a first position.

FIG. 27 illustrates a ninth example debris removal apparatus 1510. The debris removal apparatus 1510 is similar to the debris removal apparatus 1110 illustrated in FIGS. 23, 24, and 25 and described above, except as detailed below. The debris removal apparatus 1510 has a shaft 1516, an energy source 1518, a motor 1520, a fan 1522, and a switch 1524.

In the illustrated embodiment, the first portion 1536 of the shaft 1116 is pivotable relative to the second portion 1538 of the shaft 1116 using a pivotable member 1660. The first portion 1536 is moveable between a first position, as shown in FIG. 27, and a second position in which the first portion 1536 is disposed at an angle relative to the second portion 1538. The switch 1524 is positioned adjacent to the pivotable member 1660 such that movement of the first portion 1526 relative to the second portion 1538 moves the switch 1524 between its first and second positions. The motor 1520 is in the off state when the switch 1524 is in the first position and the first portion 1536 is in the first position relative to the second portion 1538. The motor 1520 is in the on state when the switch 1524 is in the second position and the first portion 1536 is in the second position relative to the second portion 1538.

Figure 28:
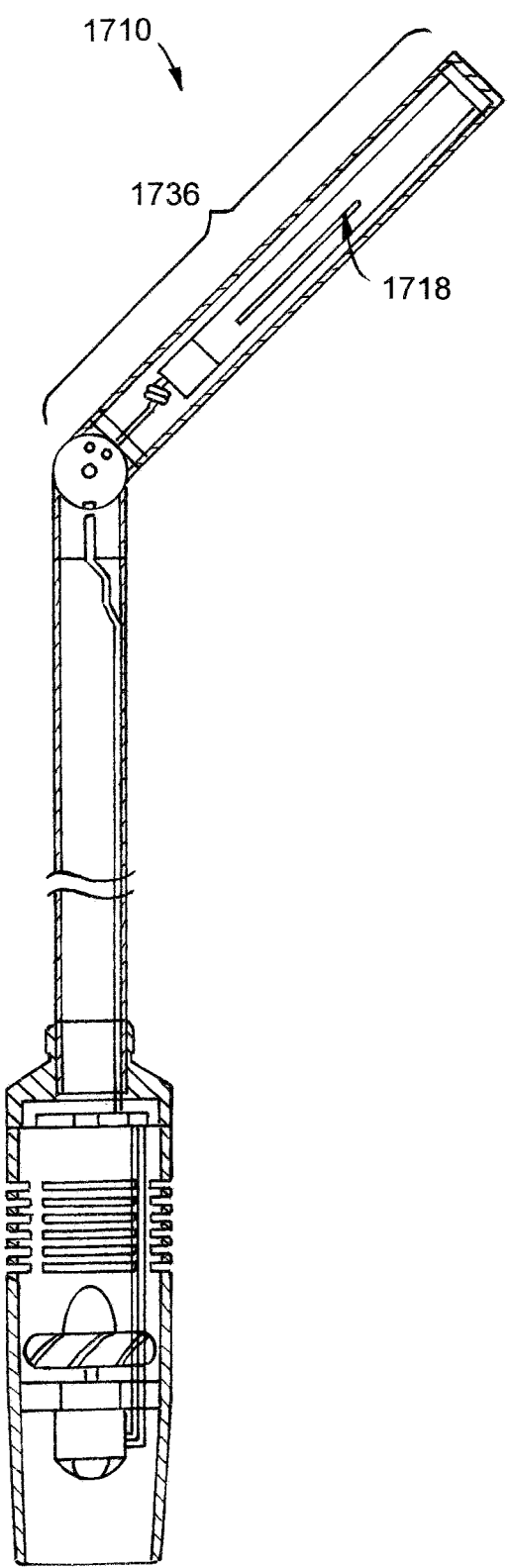
FIG. 28 is a partial cross-sectional view of a tenth example debris removal apparatus taken along the lengthwise axis of the shaft. The debris removal apparatus is in a second position.

While the energy source 1518 has been illustrated in the second portion 1538 of the shaft 1516, an energy source can be positioned at any suitable location within a shaft. For example, as shown in FIG. 28, which illustrates a tenth example debris removal apparatus 1710, an energy source 1718 can be disposed within a first portion 1736 of a shaft 1716. In addition, while a first portion has been illustrated as being pivotable relative to a second portion, any suitable portion of a shaft can be pivotable relative to another portion. Examples of suitable portions to construct such that they are pivotable relative to one another include those in which a first portion is pivotable relative to a second portion, a second portion is pivotable relative to a third portion, a third portion is pivotable relative to a first portion, combinations of the configurations described herein, and any other configuration considered suitable for a particular embodiment.

Figure 29:
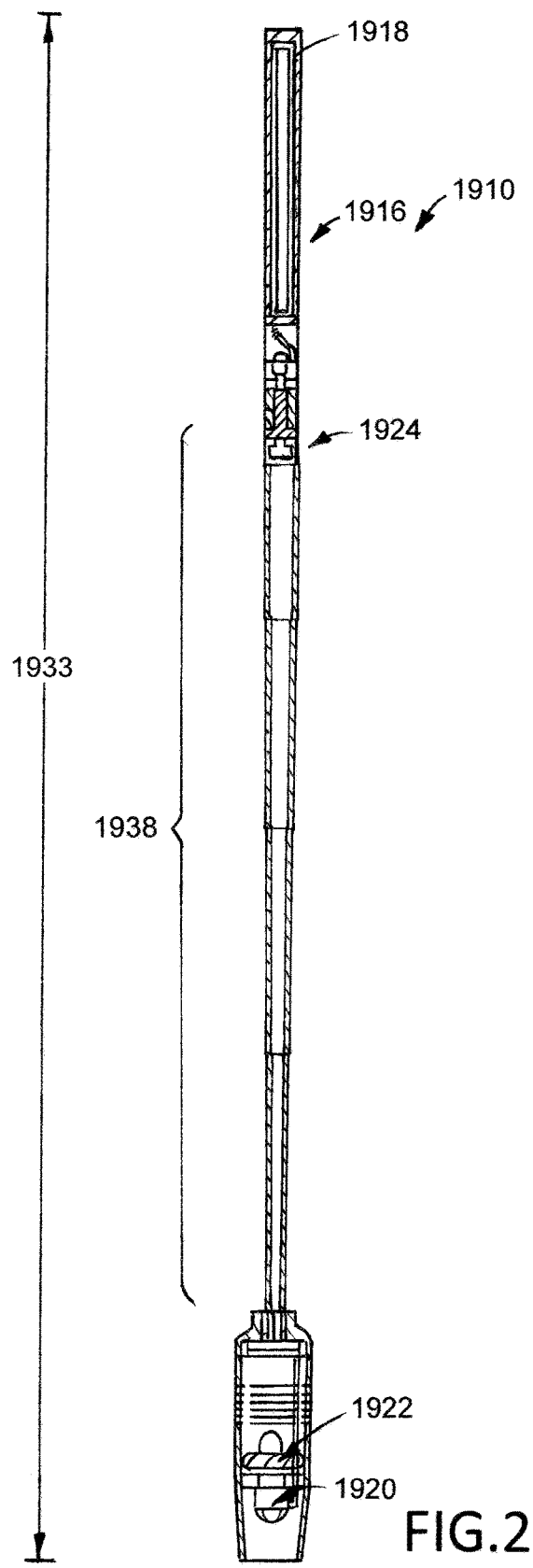
FIG. 29 is a cross-sectional view of an eleventh example debris removal apparatus taken along the lengthwise axis of the shaft. The debris removal apparatus is in a first position.
Figure 30:
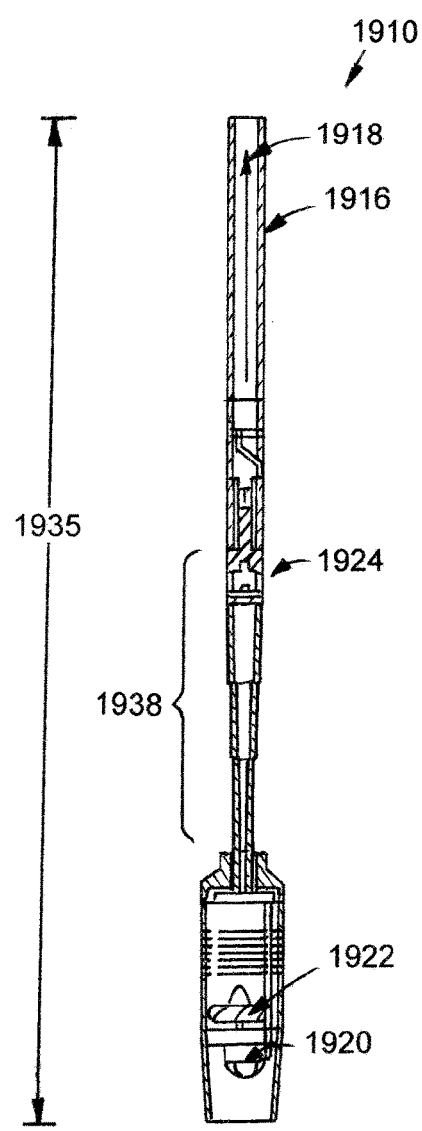
FIG. 30 shows the debris removal apparatus illustrated in FIG. 29 in a second position.

FIGS. 29 and 30 illustrate an eleventh example debris removal apparatus 1910. The debris removal apparatus 1910 is similar to the debris removal apparatus 1310 illustrated in FIG. 26 and described above, except as detailed below. The debris removal apparatus 1910 has a shaft 1916, an energy source 1918, a motor 1920, a fan 1922, and a switch 1924.

In the illustrated embodiment, the second portion 1938 of the shaft 1916 is telescopic such that the length of the shaft 1916 can be adjusted, and fixed, during use. For example, the second portion 1938 can be moved from a first position, as shown in FIG. 29, to a second position, as shown in FIG. 30. The shaft 1916 has a first length 1933 when the second portion 1938 is in the first position and a second length 1935 when the second portion 1938 is in the second position. The first length 1933 is greater than the second length 1935. Debris removal apparatus 1910 is considered advantageous at least because it provides a mechanism for a user to adjust the length of the apparatus until a desired length is achieved.

Any portion of a shaft can be made telescopic such that a mechanism for adjusting the overall length of the shaft and/or fixing the length of the shaft can be accomplished. Examples of suitable portions of a shaft to construct as telescopic portions include a first portion of a shaft, a second portion of a shaft, a third portion of a shaft, a first portion and a second portion, a second portion and a third portion, a first portion and a third portion, a first portion, a second portion, and a third portion, and any other configuration considered suitable for a particular embodiment.

Figure 31:
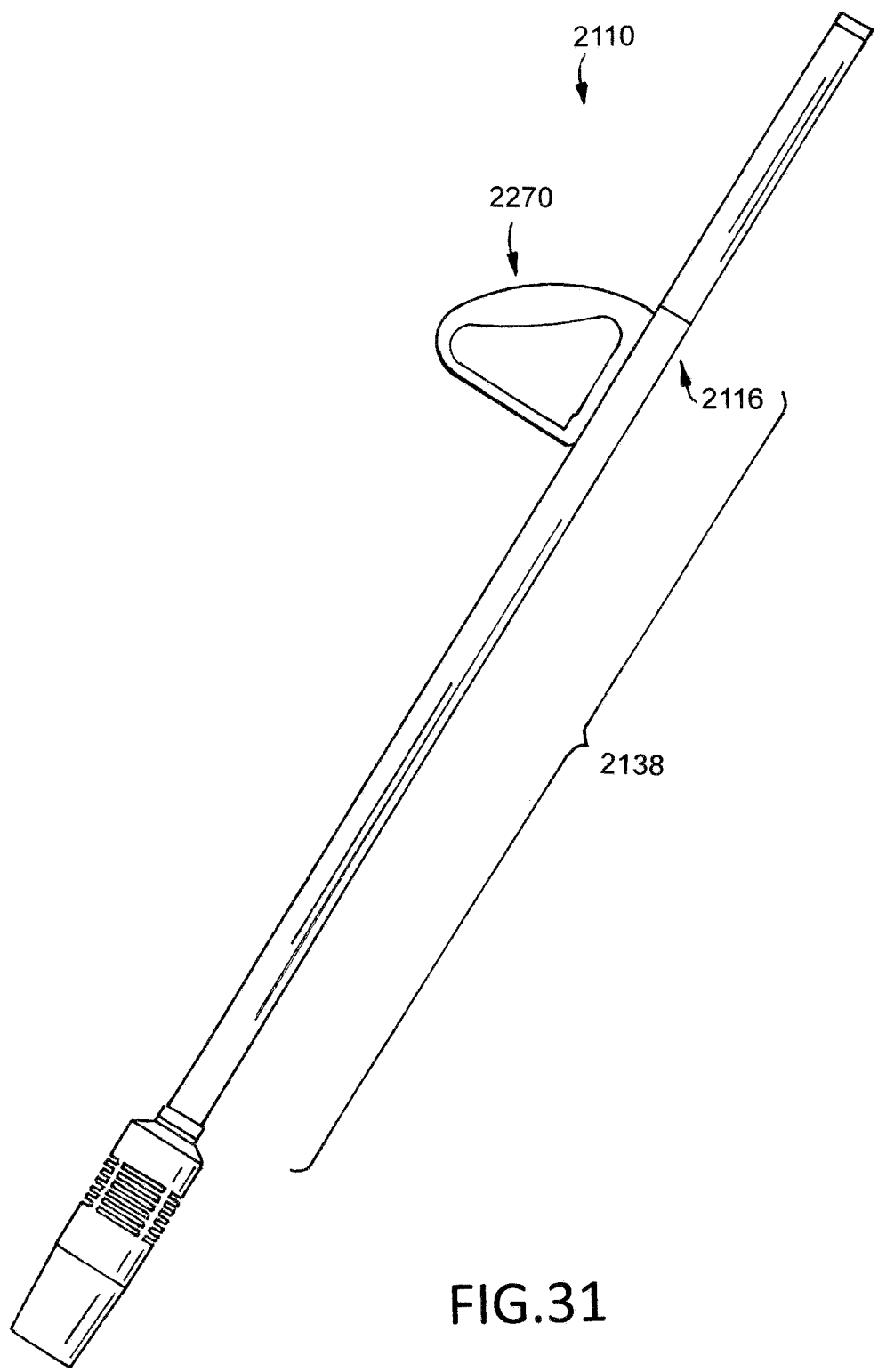
FIG. 31 is a perspective view of a twelfth example debris removal apparatus.

FIG. 31 illustrates a twelfth example debris removal apparatus 2110. The debris removal apparatus 2110 is similar to the debris removal apparatus 1110 illustrated in FIGS. 23, 24, and 25 and described above, except as detailed below. The debris removal apparatus 2110 has a shaft 2116, an energy source, a motor, a fan, and a switch.

In the illustrated embodiment, the debris removal apparatus 2110 includes a handle 2270 attached to the second portion 2138 of the shaft 2116. A handle included in a debris removal apparatus can have any suitable structural arrangement, be positioned on any suitable portion of a shaft, be formed of any suitable material, and be attached to a shaft using any suitable technique or method. Selection of a suitable structural arrangement of a handle, position to locate a handle on a shaft, material to form a handle, and of a type of attachment between a handle and a shaft can be based on various considerations, including the material that forms a shaft. For example, a handle included in a debris removal apparatus can include a switch that moves a motor between its on and off states, or manipulates the speed of a motor in embodiments in which a variable speed motor is being utilized, when the switch is moved between its first and second positions, or between its first position and a position between its first and second positions. Examples of locations considered suitable to position a handle on a shaft include on a first portion, second portion, third portion, combinations of the locations described herein, and any other location considered suitable for a particular embodiment. Examples of materials considered suitable to form a handle include those described herein with respect to forming a shaft, and any other material considered suitable for a particular embodiment. Examples of techniques and methods of attachment considered suitable between a handle and a shaft include those described herein, releasable attachments, permanent attachments, and any other technique or method of attachment considered suitable for a particular embodiment.

Figure 32:
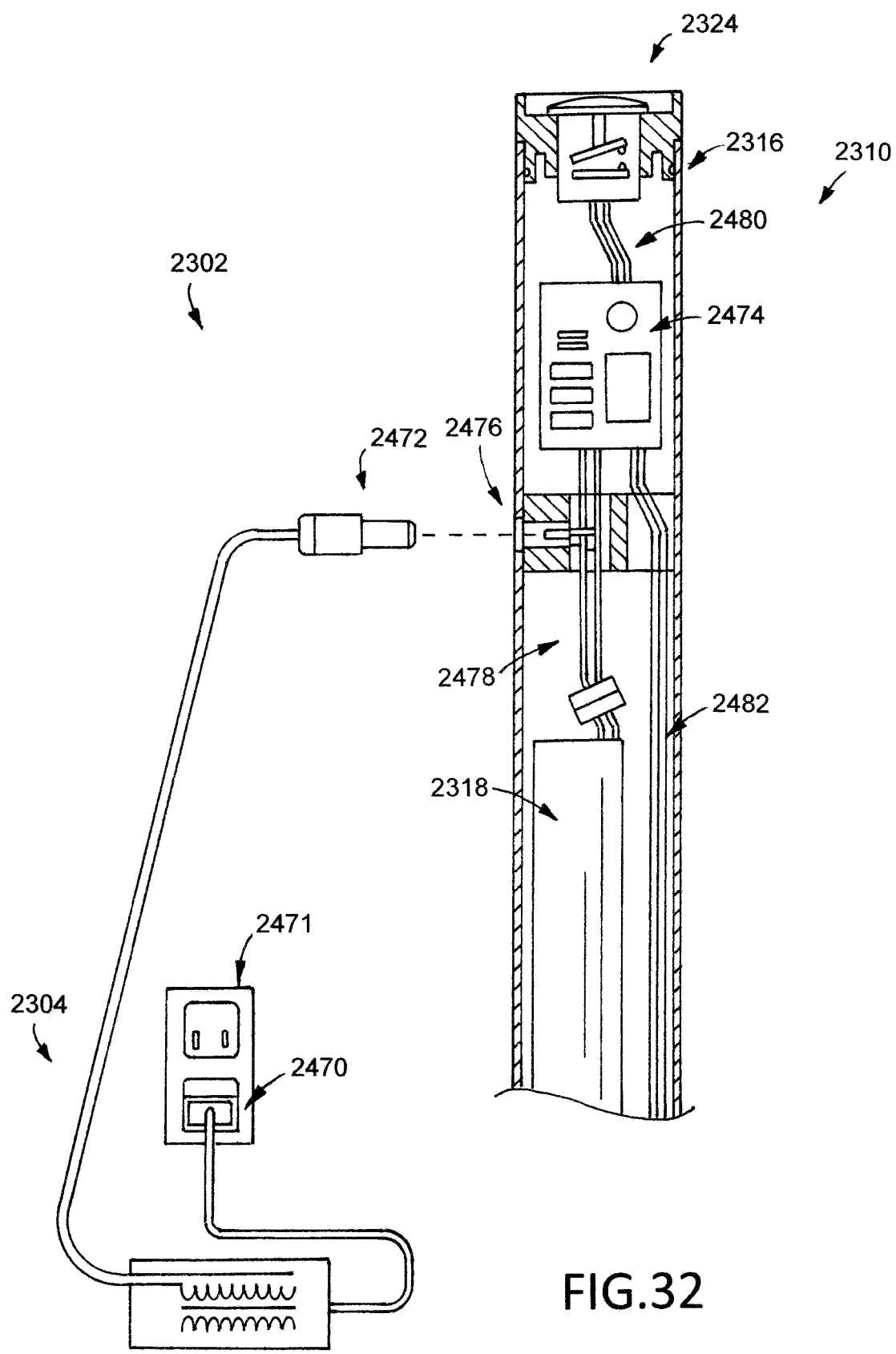
FIG. 32 is a partial view of a first example debris removal system.

FIG. 32 illustrates a first example debris removal system 2302. The debris removal system 2302 includes a battery charger 2304 and a debris removal apparatus 2310.

The battery charger 2304 can comprise any conventional battery charging device that provides a user with the ability to charge an energy source within a debris removal apparatus. In the illustrated embodiment, the battery charger 2304 has a first end 2470 and a second end 2472. The first end 2470 is adapted to be plugged into a conventional outlet 2471. The second end 2472 is adapted to be received by a charging receptacle 2476 disposed on the debris removal apparatus 2310, as described in more detail herein.

The debris removal apparatus 2310 is similar to the debris removal apparatus 110 illustrated in FIG. 9 and described above, except as detailed below. The debris removal apparatus 2310 has a shaft 2316, an energy source 2318, a motor, a fan, and a switch 2324. In the illustrated embodiment, the debris removal apparatus 2310 includes a combined potentiometer and ESC 2474, a charging receptacle 2476, and a switch 2324 similar to the switch 24 illustrated in FIGS. 4, 5, and 6. The combined potentiometer and ESC 2474 is operatively connected to the energy source 2318 using a first set of conductive wires 2478, the switch 2324 using a second set of conductive wires 2480, and the motor using a third set of conductive wires 2482. The charging receptacle 2476 is operatively connected to the energy source 2318, is sized and configured to receive the second end 2472 of the battery charger 2304, and provides a mechanism for operatively connecting the energy source 2318 to the battery charger 2304.

FIGS. 33, 34, and 35 illustrate a second example debris removal system 2502. The debris removal system 2502 includes a battery charger 2504, a hub 2506, and a debris removal apparatus 2510.

In the illustrated embodiment, the battery charger 2504 is operatively connected to the hub 2506. The hub 2506 includes contact plates 2684 and is mountable to a surface, such as a wall 2685. The debris removal apparatus 2510 is similar to the debris removal apparatus 2310 illustrated in FIG. 32 and described above, except as detailed below. In the illustrated embodiment, the debris removal apparatus 2510 includes contact plates 2686 on the first portion 2536 that are sized and configured to mate with the contact plates 2684 of the hub 2506. The contact plates 2686 of the debris removal apparatus 2510 are operatively connected to energy source 2518 such that when debris removal apparatus 2510 is disposed within hub 2506, as shown in FIGS. 33, 34, and 35, the energy source 2518 can be charged for use. The debris removal apparatus 2510 is releasably attachable to the hub 2506 such that it can be removed for use or positioned within the hub 2506 when charging is required.

Figure 36:
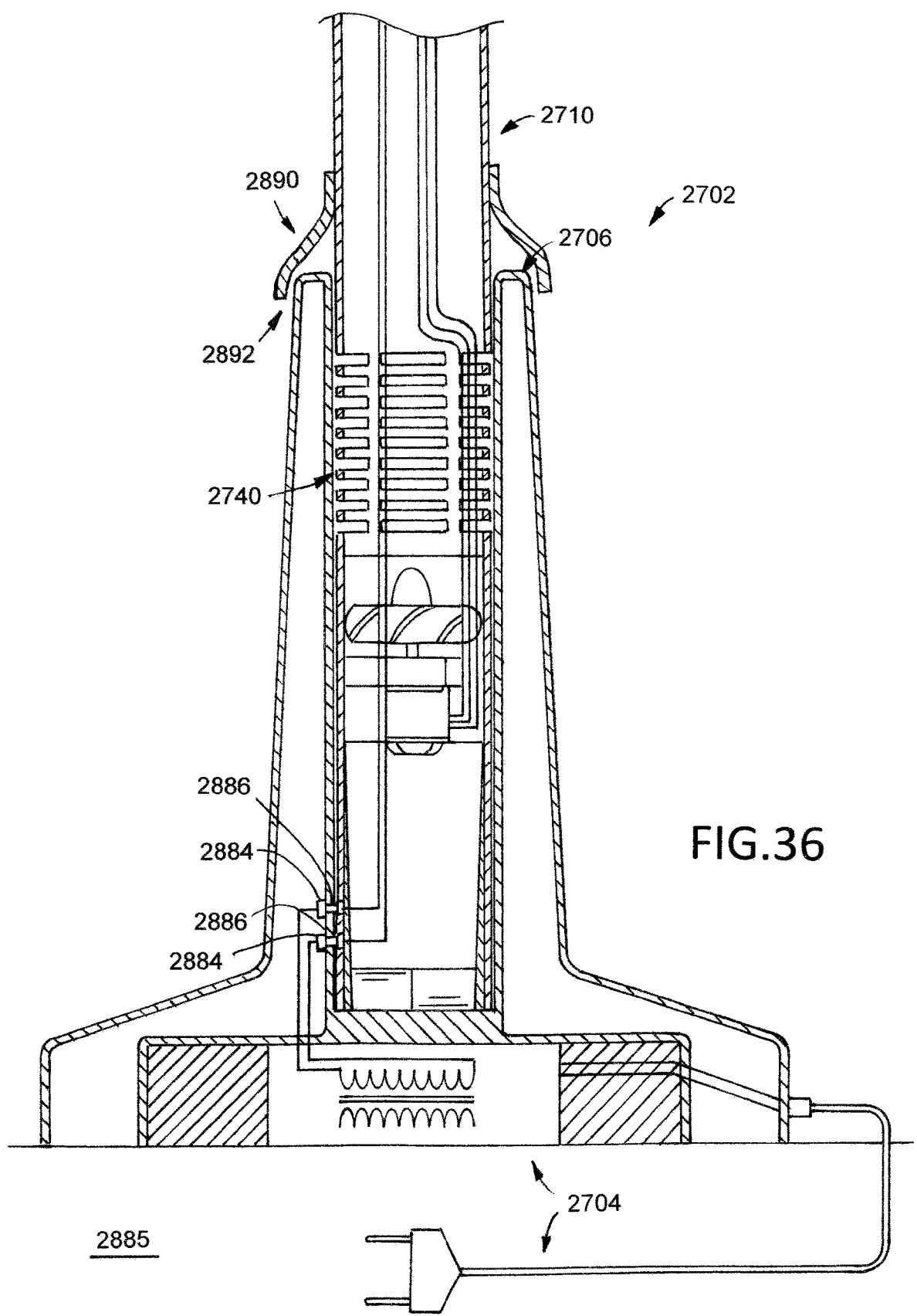
FIG. 36 is a partial cross-sectional view of a third example debris removal system taken along the lengthwise axis of the shaft of the debris removal apparatus.

FIG. 36 illustrates a third example debris removal system 2702. The debris removal system 2702 includes a battery charger 2704, a hub 2706, and a debris removal apparatus 2710.

In the illustrated embodiment, the battery charger 2704 is operatively connected to the hub 2706. The hub 2706 includes contact plates 2884 and is mountable to a surface, such as a floor 2885. The debris removal apparatus 2710 is similar to the debris removal apparatus 2510 illustrated in FIGS. 33, 34, and 35 and described above, except as detailed below. In the illustrated embodiment, the debris removal apparatus 2710 includes contact plates 2886 and a guard 2890. The contact plates 2886 are disposed on the third portion 2740 and are sized and configured to mate with the contact plates 2884 of the hub 2706. The contact plates 2886 of the debris removal apparatus 2710 are operatively connected to energy source such that when debris removal apparatus 2710 is disposed within hub 2706, as shown in FIG. 36, the energy source 2718 can be charged for use. The debris removal apparatus 2710 is releasably attachable to the hub 2706 such that it can be removed for use or positioned within the hub 2706 when charging is required. The guard 2890 is releasably disposed on the shaft 2716 and is configured to overlap a first end 2892 of the hub 2706 such that rain and other substances are prevented from entering into the hub 2706. The guard 2890 can be formed of any suitable material, such as those described herein. While the guard 2890 has been described as being releasably attached to the shaft 2716, a hub can alternatively be fixedly attached to, or formed as an integrated component of, a shaft.

While the battery chargers, hubs, and debris removal apparatus of the various systems described herein have been illustrated as having a particular structural arrangement, a battery charger, hub, and debris removal apparatus can have any suitable structural arrangement. Selection of a suitable structural arrangement for a battery charger, hub, and/or debris removal apparatus can be based on various considerations, including the materials forming each of the components. For example, a hub can have a structural arrangement that allows it to be attached to any suitable surface, such as a wall and/or floor.

Various methods of using a debris removal apparatus are described herein. While the methods described herein are shown and described as a series of acts, it is to be understood and appreciated that the methods are not limited by the order of acts, as some acts may in accordance with these methods, occur in the order shown and/or described, in different orders, and/or concurrently with other acts described herein.

Figure 37:
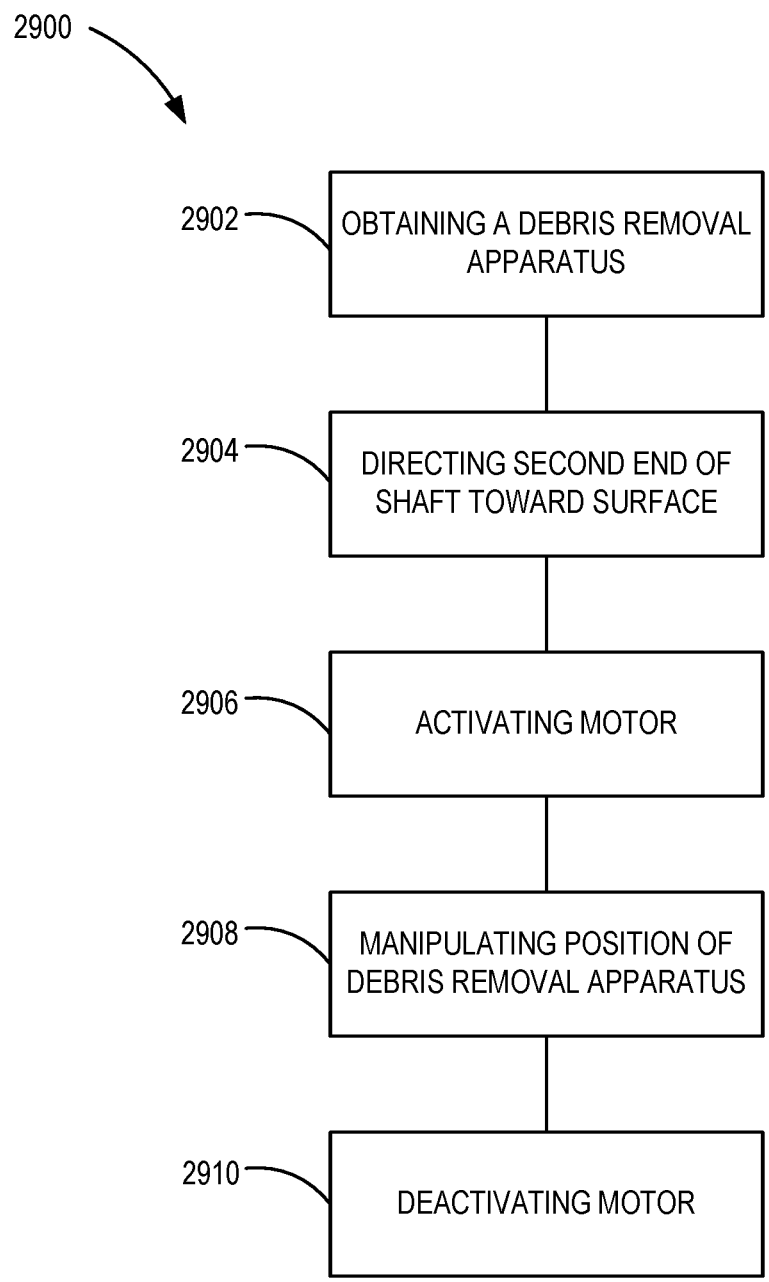
FIG. 37 is a schematic illustration of an example method of using a debris removal apparatus to remove debris from a surface.

FIG. 37 is a schematic illustration of an example method 2900 of using a debris removal apparatus to remove debris from a surface.

A step 2902 comprises obtaining a debris removal apparatus. The debris removal apparatus has a shaft, an energy source, a motor, a fan, and a switch. Another step 2904 comprises directing the second end of the shaft toward a surface. Another step 2906 comprises activating the motor of the debris removal apparatus. Another step 2908 comprises manipulating the position of the debris removal apparatus relative to the surface such that debris is removed from the surface, or the position of the debris has been altered. Another step 2910 comprises deactivating the motor of the debris removal apparatus.

Step 2902 can be accomplished using any suitable debris removal apparatus and selection of a suitable debris removal apparatus can be based on various considerations, including the type of debris intended to be removed from a surface. Examples of debris removal apparatus considered suitable to complete a method of using a debris removal apparatus include debris removal apparatus 10, debris removal apparatus 110, debris removal apparatus 310, debris removal apparatus 510, debris removal apparatus 710, debris removal apparatus 910, debris removal apparatus 1110, debris removal apparatus 1310, debris removal apparatus 1510, debris removal apparatus 1710, debris removal apparatus 1910, debris removal apparatus 2110, debris removal apparatus 2310, debris removal apparatus 2510, debris removal apparatus 2710, and any other debris removal apparatus considered suitable for a particular embodiment. In an alternative embodiment, step 2902 can comprise removing a debris removal apparatus from a storage member, such as a battery charger, hub, or golf bag. This alternative step can be accomplished by applying a force on a debris removal apparatus directed away from the storage member until the debris removal apparatus is free of the storage member.

Step 2904 can be accomplished by applying a force on the debris removal apparatus such that the second end of the shaft is directed toward a surface.

Step 2906 can be accomplished by applying a force on a portion of the debris removal apparatus (e.g., switch) such that the motor moves from an off state to an on state. For example, a force can be applied directly on a switch, or on a portion of a shaft (e.g., first portion, second portion, third portion) such that the portion of the shaft moves relative to another portion of the shaft (e.g., first portion, second portion, third portion) and moves the motor from an off state to an on state.

Step 2908 can be accomplished by applying a force on the debris removal apparatus such that its position relative to a surface is being manipulated and debris is removed from the surface, or the position of the debris has been altered.

Step 2910 can be accomplished by applying a force on a portion of the debris removal apparatus (e.g., switch) such that the motor moves from an on state to an off state. For example, a force can be applied directly on a switch, or on a portion of a shaft (e.g., first portion, second portion, third portion) such that the portion of the shaft moves relative to another portion of the shaft (e.g., first portion, second portion, third portion) and moves the motor from an on state to an off state.

An optional step comprises positioning a debris removal apparatus within a storage member, such as a battery charger, hub, or golf bag. This optional step can be accomplished by applying a force on a debris removal apparatus directed toward the storage member until the debris removal apparatus is disposed within the storage member.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A debris removal apparatus comprising:
   a shaft having a first end, a second end, a first inside diameter, a second inside diameter, and defining an opening on the second end, a passageway in fluid communication with the opening, and a plurality of inlet openings in fluid communication with the passageway, the passageway extending from the opening on the second end and toward the first end, the plurality of inlet openings having a plurality of inlet openings first end and a plurality of inlet openings second end, the plurality of inlet openings first end having the first inside diameter and disposed between the first end of the shaft and the plurality of inlet openings second end, the second inside diameter disposed at the second end and being less than the first inside diameter;
   an energy source disposed on the shaft;
   a motor operatively connected to the energy source and disposed between the plurality of inlet openings and the second end of the shaft; and
   a fan attached to the motor.

2. The debris removal apparatus of claim 1, wherein the shaft has a lengthwise axis; and
   wherein the motor has a lengthwise axis, a drive shaft, and on and off states, the lengthwise axis of the motor extending through the drive shaft and parallel to the lengthwise axis of the shaft.

3. The debris removal apparatus of claim 2, wherein the lengthwise axis of the shaft and the lengthwise axis of the motor are coaxial.

4. The debris removal apparatus of claim 1, wherein the motor has on and off states;
   further comprising a switch operatively connected to the motor and moveable between first and second positions, movement of the switch between the first and second positions moving the motor between its off and on states.

5. The debris removal apparatus of claim 4, wherein the switch is disposed on the first end of the shaft.

6. The debris removal apparatus of claim 1, wherein the motor is a variable speed motor.

7. The debris removal apparatus of claim 1, wherein the fan is disposed a distance from the second end of the shaft that is less than 10 inches.

8. The debris removal apparatus of claim 1, wherein the fan is disposed a distance from the second end of the shaft that is equal to about 3 inches.

9. The debris removal apparatus of claim 1, wherein the fan is attached to the motor a distance from the first end of the shaft that is greater than 35 inches.

10. The debris removal apparatus of claim 1, wherein the shaft has a lengthwise axis; and
    wherein the shaft has a first portion, a second portion, and a third portion, the first portion extending from the first end toward the second end, the second portion disposed between the first portion and the third portion, the third portion extending from the second end toward the first end to the second portion, the second portion having a length measured along the lengthwise axis of the shaft between about 10 inches and about 40 inches.

11. The debris removal apparatus of claim 1, further comprising an insert disposed within the passageway, the insert having an insert first end, an insert second end, and an insert main body defining an insert passageway having an insert first inside diameter at the insert first end and an insert second inside diameter at the insert second end that is less than the insert first inside diameter.

12. The debris removal apparatus of claim 1, further comprising a frustoconical air guide disposed within the passageway defined by the shaft, the frustoconical air guide disposed between the motor and the first end of the shaft.

13. A debris removal apparatus comprising:
    a shaft having a lengthwise axis, a first end, a second end, a first portion, a second portion, a third portion, and defining an opening on the second end, a passageway in fluid communication with the opening, and a plurality of inlet openings in fluid communication with the passageway, the first portion extending from the first end toward the second end, the second portion disposed between the first portion and the third portion, the third portion extending from the second end toward the first end to the second portion, the second portion having a length measured along the lengthwise axis of the shaft between about 10 inches and about 40 inches, the passageway extending from the opening on the second end and toward the first end, each opening of the plurality of inlet openings positioned on the third portion;

an energy source disposed on the shaft;

a motor operatively connected to the energy source and disposed between the plurality of inlet openings and the second end of the shaft; and a fan attached to the motor;

further comprising an insert disposed within the passageway, the insert having an insert first end, an insert second end, and an insert main body defining an insert passageway having an insert first inside diameter at the insert first end and an insert second inside diameter at the insert second end that is less than the insert first inside diameter.

14. The debris removal apparatus of claim 10, wherein each opening of the plurality of inlet openings is positioned on the third portion.

* * * * *